United States Patent [19]
Nakata

[11] Patent Number: 5,987,162
[45] Date of Patent: Nov. 16, 1999

[54] IMAGE PROCESSING METHOD AND APPARATUS FOR RECOGNIZING AN ARRANGEMENT OF AN OBJECT

[75] Inventor: Masafumi Nakata, Tokyo, Japan

[73] Assignee: Mitsubishi Denki Kabushiki Kaisha, Tokyo, Japan

[21] Appl. No.: 08/722,643

[22] Filed: Sep. 27, 1996

[30] Foreign Application Priority Data

Mar. 27, 1996 [JP] Japan ................................. 8-072381

[51] Int. Cl.[6] ............................... G06K 9/00; G06K 9/46
[52] U.S. Cl. ........................ 382/152; 382/141; 382/203
[58] Field of Search ..................... 382/152, 216, 382/289, 136, 151, 287, 141, 144, 209, 203, 291, 294, 293, 296; 358/488; 395/105

[56] References Cited

U.S. PATENT DOCUMENTS

| | | | |
|---|---|---|---|
| 4,267,573 | 5/1981 | Chaikin et al. | 382/296 |
| 4,843,631 | 6/1989 | Steinpichler et al. | 382/280 |
| 5,063,604 | 11/1991 | Weiman | 382/170 |
| 5,063,605 | 11/1991 | Samad | 382/293 |
| 5,164,997 | 11/1992 | Kumagai | 382/294 |
| 5,189,711 | 2/1993 | Weiss et al. | 382/203 |
| 5,347,591 | 9/1994 | Onishi et al. | 382/147 |
| 5,655,030 | 8/1997 | Suzuki | 382/152 |

FOREIGN PATENT DOCUMENTS

| | | | |
|---|---|---|---|
| 37 16420 | 11/1987 | Germany | G06K 9/52 |
| 61-239377 | 10/1986 | Japan | G06K 9/00 |
| 63-56764 | 3/1988 | Japan | G06F 15/70 |
| 2-122380 | 5/1990 | Japan | G06F 15/70 |
| 2-189697 | 7/1990 | Japan | G06K 9/46 |
| 3-290786 | 12/1991 | Japan | G07D 5/00 |
| 4-302066 | 10/1992 | Japan | G06F 16/70 |
| 6-309461 | 11/1994 | Japan | G06F 15/70 |
| 7-37089 | 2/1995 | Japan | G06T 7/00 |

OTHER PUBLICATIONS

"A Survey of Image Registration Techniques," L. G. Brown, ACM Computing Surveys, vol. 24, No. 4, Dec. 1992, pp. 325–376.

G. Nehr, P. Martini, "Drehlageerkennung Von Objekten Mit Optischen Sensoren"; In: DIV–journal 121 (1979), No. 10, pp. 477–483.

Primary Examiner—Thomas D. Lee
Assistant Examiner—Wenpeng Chen
Attorney, Agent, or Firm—Sughrue, Mion, Zinn, Macpeak & Seas, PLLC

[57] ABSTRACT

An image processing method includes the steps of setting a predetermined concentric circular area of first and second image data as a workpiece image, dividing a plurality of pixels constituting the workpiece image in the concentric circular area into a concentric circuit arrangement and extracting the plurality of pixels, generating the plurality of pixels in the divided concentric circuit arrangement as a function of the central angular position of the concentric circle, computing the initial term resulting from subjecting the luminance of the plurality of pixels in the concentric circular arrangement to Fourier expansion together with the central angular position, computing the central angular position where the initial term of Fourier expansion is maximized as a function of a plurality of concentric radii, and comparing the function with the first and second image data so as to recognize the arrangement of an object to be detected.

7 Claims, 47 Drawing Sheets

RADIUS OF CONCENTRIC CIRCLE
(REDUCING DIRECTION)

RADIUS OF CONCENTRIC CIRCLE
(REDUCING DIRECTION)

FIG. 29A
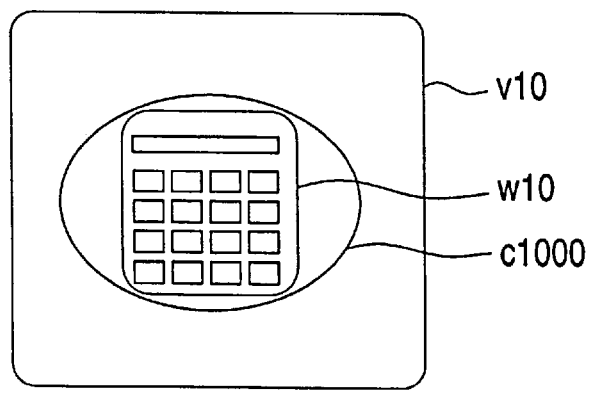
FIG. 29B
FIG. 29C
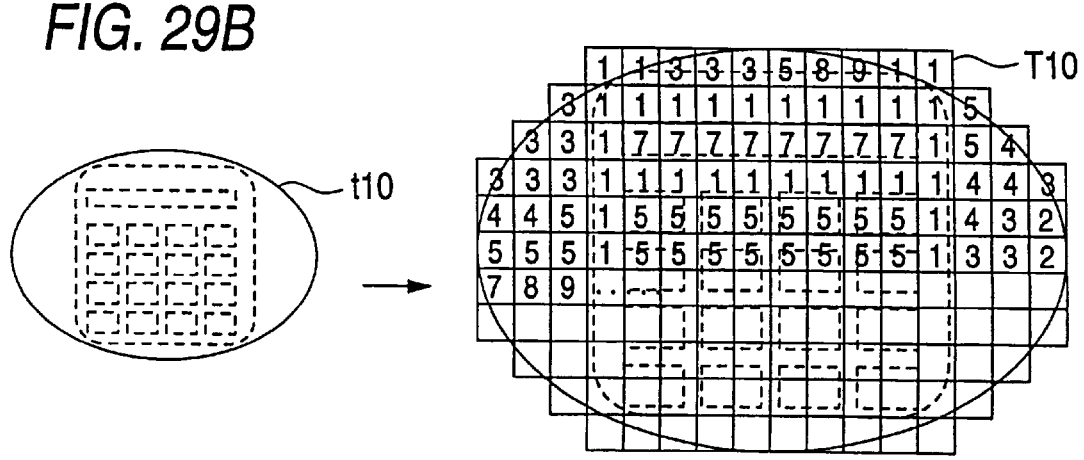

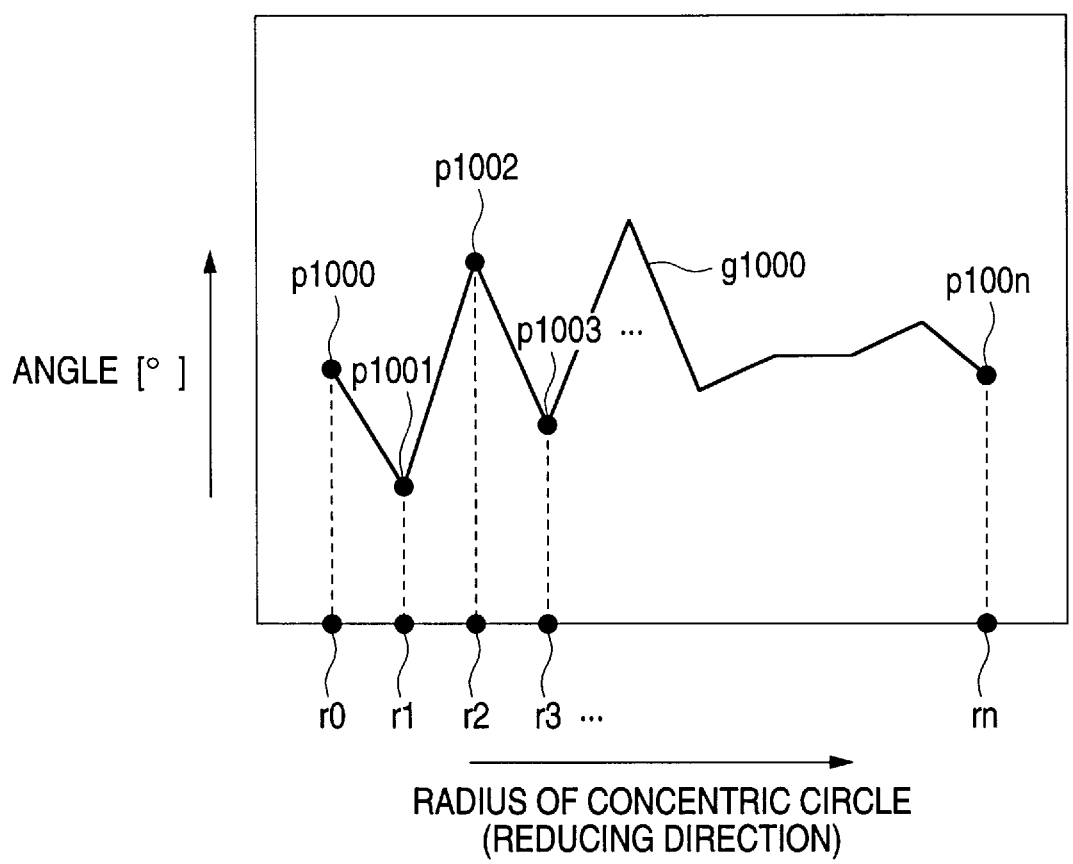

RADIUS OF CONCENTRIC CIRCLE
(REDUCING DIRECTION)

RADIUS OF CONCENTRIC CIRCLE
(REDUCING DIRECTION)

FIG. 43A
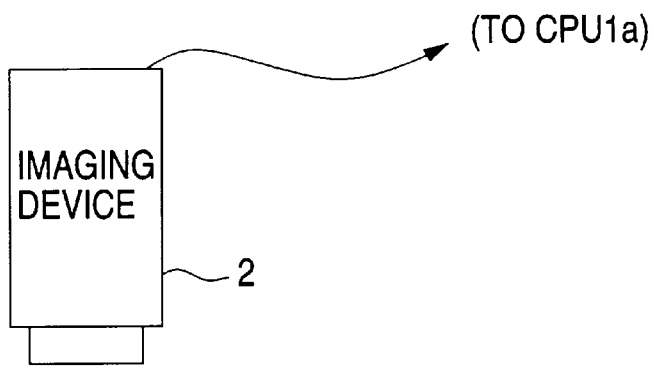
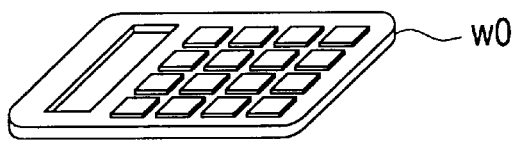
FIG. 43B
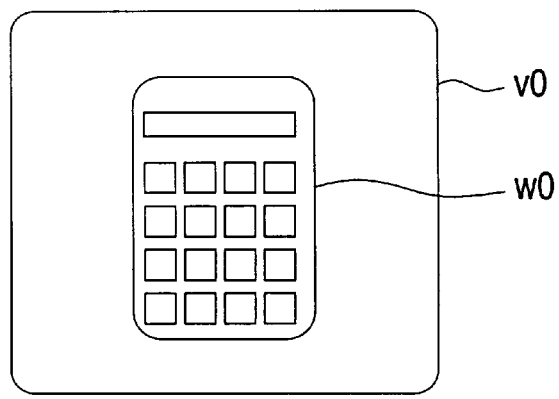

IMAGE PROCESSING METHOD AND APPARATUS FOR RECOGNIZING AN ARRANGEMENT OF AN OBJECT

BACKGROUND OF THE INVENTION

1. Field of the Invention

The present invention relates to an image processing method and apparatus for computing a position from a reference point or an inclination from a reference line as a condition in which a workpiece is disposed using not only data concerning a workpiece image picked up for the purpose of detecting the position of the workpiece as an object for detection but also pre-cataloged data concerning the workpiece image.

2. Description of the Related Art

FIGS. 41A and 41B are schematic block diagrams illustrating a conventional image processing apparatus. The conventional image processing apparatus comprises a central processing unit (hereinafter referred to as "CPU") 1a for performing control and arithmetic processes in the entire apparatus, an imaging device 2 for optically fetching a workpiece image, a storage device 3a for storing operational program data for the CPU 1a and results of operations, a display unit 4 for graphically displaying a position where a workpiece is detected on the basis of the results of operations performed by the CPU 1a, an input device 5 for feeding input data and command data to the CPU 1a, an output device 6 for outputting the contents displayed on the display unit 4 in the form of characters and the like, a communication device 7 for transferring the detected position data to other devices, an image fetch means 301 for fetching the image stored in the storage device 3a, a workpiece image data cataloging means 302a for cataloging image data on a workpiece as an object whose position and tilted angle are to be detected, a rotated workpiece image generating means 341 for generating an image t0a1–t0a359 resulting from rotating the workpiece out of cataloged workpiece image data t0a so as to detect its tilted angle, and a correlation value computing means 306a for computing the correlation value between the workpiece image data t0a and image data v1 fetched from the imaging device 2 to detect the position of the workpiece together with its tilted angle.

A description will subsequently be given of a method of cataloging the image of a workpiece w0 so as to detect the position of the workpiece and its tilted angle as shown in FIGS. 43A and 43B by means of the conventional image processing apparatus thus configured by reference to a flowchart of FIG. 42, diagrams of FIGS. 43A and 43B in a workpiece imaging mode, diagrams of FIGS. 44A and 44B in a workpiece image data mode, diagrams of FIGS. 45A and 45B in a rotated workpiece image data mode, diagrams of FIGS. 46A and 46B in a fetched image data imaging mode, and diagrams of FIGS. 47A and 47B in a mode of detecting the position-tilted angle of the workpiece. In order to distinguish visual displays on the display unit in the drawings above from those illustrative of internal processing in an easy-to-understand way, reference characters starting with v such as v0, v1 will be employed as those representing visual displays of FIGS. 43B, 47A, 47B and so forth.

At Step S501 of FIG. 42, first, a workpiece image data creation command is input by the input device 5 of FIG. 41A (workpiece image data creation command).

At Step S502 then, the CPU 1a starts the image fetch means 301 of the storage device 3a to fetch an image of the workpiece w0 shown in FIG. 43A from the imaging device 2 (fetching of image).

At Step S503, further, the CPU 1a displays on the display unit 4 the image data v0 shown in FIG. 43B (display of fetched image).

At Step S504, further, a workpiece image data size-position setting command is input by the input device 5 to make the CPU 1a display on the display unit 4 a rectangular window frame c0a of FIG. 44A in which the size-position of the workpiece image data are shown. Then the CPU 1a is made to extract pixel data within the frame c0a by inputting the size-position data on the workpiece image data, changing the frame c0a into the input size and moving it to the input position and to generate the pixel data as the workpiece image data t0a shown in FIG. 44B (designation of size-position of workpiece image data). In FIG. 44B, workpiece image data T0a represents the structure of the workpiece image data t0a and the workpiece image data T0a is configured in the form of grid-spaced luminance data. Numerical values 1, 5, 7, . . . denote the luminance of the workpiece image data.

At Step S505, the CPU 1a starts the rotated workpiece image generating means 341 and turns the workpiece image data t0a, degree by degree, up to 359° to generate the rotated workpiece image data ranging from t0a1 up to t0a359 as shown in FIG. 45A (rotated workpiece image generation). In FIG. 45B, moreover, the rotated workpiece image data T0a20 represents the structure of the rotated workpiece image data T0a20 resulting from turning the workpiece image data t0a through an angle of 20°. The rotated workpiece image data T0a20 is such that luminance data on the workpiece image data t0a is turned through an angle of 20° and stored in a grid-spaced arrangement. The other rotated workpiece image data ranging from t0a1 up to t0a19 and those ranging from t0a21 up to t0a359 are turned degree by degree and stored in the grid-spaced arrangement likewise.

At Step S506, the CPU 1a starts the workpiece image data cataloging means 302a of the storage device 3a and stores in the storage device 3a the workpiece image data t0a and the rotated workpiece image data t0a1–t0a359 (cataloging of workpiece image data).

At Step S507, a position-tilted angle detection command and the threshold value s0a of the correlation value sa between the workpiece image data t0a and the fetched image data are input by the input device 5 of FIG. 41A (position-tilted angle detection command). In this case, the threshold value s0a of the correlation value is set so that only a greater correlation value is detected: for example, 90% of the maximum value of the correlation value sa that can be taken.

At Step S508, further, the CPU 1a terminates the processing when it is interrupted by a termination command (reception of termination command).

In the absence of the termination command at Step S509, the CPU 1a starts the image fetch means 301 of the storage device 3a and has a workpiece w1 of FIG. 46A picked up by the imaging device 2 in order that the image data v1 shown in FIG. 46B may be displayed on the display unit 4 (fetching of image). In this case, the workpiece w1 is tilted by an angle of "a" and placed within the visual field of the imaging device 2.

At Step S510, the CPU 1a superimposes the workpiece image data t0a and the fetched image data v1, starts the correlation value computing means 306a of the storage device 3a and then computes the correlation value sa between the workpiece image data t0a and the fetched image data v1 using the following correlation equation (1) based on normal correlation (correlation value computation).

[Numerical Formula 1] (1)

$$sa = \sum_{i=0}^{n-1}(Fi \times Gi) \bigg/ \sqrt{\sum_{i=0}^{n-1}(Fi \times Fi)} \times \sqrt{\sum_{i=0}^{n-1}(Gi \times Gi)}$$

Where the symbol Fi represents the luminance value of the i-th pixel of the workpiece image data t0a; Gi, the luminance value of the i-th subscript of the fetched image data vi; n, the number of pixels of workpiece image data; and the subscript i, a pixel number.

At Step S511, the CPU 1a decides that when the correlation value sa is greater than the threshold value s0a, the workpiece image data t0a correlates with the fetched image data v1. FIG. 47B shows that the luminance of workpiece image data T0a 35 appears to conform to workpiece image data t0a 35 on the fetched image data v1. FIG. 47A refers to a case where workpiece image data T0a20, for example, is situated in a position in nonconformity with the position of the workpiece w1 on the fetched image v1, whereby the luminance of the workpiece image data remains in nonconformity with the workpiece image data (correlation exists).

At Step S512, the CPU 1a displays the position·tilted angle on the display unit 4 when the correlation is judged existent at Step S511 and sends the position·tilted angle to the communication device 7 (outputting of position·tilted angle).

At Step S513, further, the CPU 1a decides whether to have completed the computation of the correlation value sa over the whole fetched image data v1 when the correlation is judged nonexistent, shifts the position of a pixel one place where the workpiece image data t0a and the fetched image data v1 are to be superimposed when the CPU 1a decides to have not completed the computation and repeats the steps from S510 up to S513 (completion of the whole pixel computation).

At Step S514, the CPU 1a updates the rotated workpiece image data to what has an tilted angle greater by one degree when it is decided that the computation at Step S513 has been completed. For example, rotated image data t0a1 is updated to rotated image data t0a1 whose tilted angle is greater than the former data by one degree (update to the next workpiece image data).

At Step S515, further, the CPU 1a regards the process of detecting the position·tilted angle of the whole rotated workpiece image data as being completed and completes the processing of the workpiece w1 when rotated workpiece image data to be updated is the rotated workpiece image data t0a359 at Step S514. At Step S508, the CPU 1a alters the position·tilted angle of the workpiece w1 or replaces the workpiece w1 with another one similar in configuration until receiving the termination command and repeats the steps from S509 up to S515 (completion of processing the whole rotated workpiece image data).

Since the conventional image processing apparatus is configured as described above, the problem is that when a workpiece is turned degree by degree up to 360°, the time required to create image data at every angle and to compute the correlation value in order to detect the tilted angle of the workpiece tends to become longer.

SUMMARY OF THE INVENTION

The present invention has been made to solve the foregoing problems, and an object of the invention is to provide an image processing method and apparatus capable of recognizing for a short processing time the position and tilted angle of a workpiece as a condition in which the workpiece is disposed.

An image processing apparatus for recognizing an arrangement of an object for detection by comparing first image data obtained through imaging the object for detection with pre-cataloged second data concerning the object therefor comprises workpiece image data cataloging means for setting a predetermined concentrically-shaped area of the first and second image data as a workpiece image; luminance graph generating means for dividing into a concentric arrangement a plurality of pixels constituting the image data in the concentrically-shaped area set by the image data cataloging means and extracting the plurality of pixels so as to generate the luminance of the plurality of pixels thus divided into the concentric arrangement as a function of a concentrically-shaped central angular position; characteristic value computing means for computing a character representing the characteristics of the luminance of the plurality of concentrically-arranged pixels generated by the luminance graph generating means together with the central angular position; and central angular position pattern computing means for computing the central angular position giving the characteristics of luminance computed by the characteristic value computing means as a function of the distance from the center of the plurality of the divided concentrically-arranged positions, wherein the arrangement of the object for detection is recognized by comparing the first and second image data with the relation between the central angular position giving the characteristics of luminance concerning the concentrically-arranged positions computed by the central angular position pattern computing means, and the distance from the center of the plurality of the divided concentrically-arranged positions.

The concentrically-shaped area is a concentrically-shaped area between a first distance from the center and a second distance therefrom.

The concentrically-shaped area is a concentric circular area.

The concentrically-shaped area is a concentric elliptic area.

The luminance graph generating means converts the plurality of pixels thus divided into a concentric elliptic arrangement to an concentric circular arrangement using a ratio of the long diameter of an ellipse to the short diameter thereof and then generates the luminance of the plurality of pixels in the concentric circular arrangement as a function of the central angular position of a concentric circle.

The arrangement of the object for detection corresponds to an inclination of the object from a reference line.

The arrangement of the object for detection corresponds to a position of the object from a reference point.

The characteristic value computing means makes it a character representing the characteristics of the luminance of the plurality of concentrically-arranged pixels that the initial term of Fourier series is a maximum value, the initial term thereof being obtained by subjecting to Fourier expansion the luminance of the plurality of concentrically-arranged pixels as a function of the central angular position generated by the luminance graph generating means in terms of the central angular position.

The characteristic value computing means makes it a character representing the characteristics of the luminance of the plurality of concentrically-arranged pixels that the center of gravity is concerned with the central angular position of the luminance as a function of the central angular position generated by the luminance graph generating means.

The characteristic value computing means makes it a character representing the characteristics of the luminance of the plurality of concentrically-arranged pixels that the luminance with respect to the central angular position of the luminance as a function of the central angular position generated by the luminance graph generating means is maximized.

The luminance graph generating means extracts the plurality of concentrically-arranged pixels by thinning out the pixels at a predetermined thinning ratio and generates the luminance of the plurality of concentrically-arranged pixels thus extracted as a function of the concentrically-shaped central angular position.

The characteristic value computing means makes a non-zero value a character representing the characteristics of the luminance, the non-zero value being selected from among values of the initial term of Fourier series.

When values of the initial term of Fourier series are totally zero, the characteristic value computing means decides that the object for detection has such a shape that its inclination from the reference line is unspecifiable.

An image processing method for recognizing an arrangement of an object for detection by comparing first image data obtained through imaging the object for detection with pre-cataloged second data concerning the object therefor comprises the steps of setting a predetermined concentrically-shaped area of the first and second image data as a workpiece image; dividing into a concentric arrangement a plurality of pixels constituting the image data in the concentrically-shaped area and extracting the plurality of pixels so as to generate the luminance of the plurality of pixels thus divided into the concentric arrangement as a function of a concentrically-shaped central angular position; computing a character representing the characteristics of the luminance of the plurality of concentrically-arranged pixels together with the central angular position; computing the central angular position giving the characteristics of luminance as a function of the distance from the center of the plurality of the divided concentrically-arranged positions; and comparing the first and second image data with the relation between the central angular position giving the characteristics of luminance concerning the concentrically-arranged positions and the distance from the center of the plurality of the divided concentrically-arranged positions so as to recognize the arrangement of the object for detection.

The concentrically-shaped area is a concentric circular area.

The concentrically-shaped area is a concentric elliptic area.

The arrangement of the object for detection corresponds to an inclination of the object from a reference line.

The arrangement of the object for detection corresponds to a position of the object from a reference point.

A character representing the characteristics of the luminance of the plurality of concentrically-arranged pixels features that the initial term of Fourier series is a maximum value, the initial term thereof being obtained by subjecting to Fourier expansion the luminance of the plurality of concentrically-arranged pixels as a function of the central angular position generated in terms of the central angular position.

The above and other objects and features of the present invention will be more apparent from the following description taken in conjunction with the accompanying drawings.

BRIEF DESCRIPTION OF THE DRAWINGS

FIGS. 29A–29C are diagrams illustrating data structure of a workpiece image according to the seventh embodiment of the invention;

FIG. 33 is a graph illustrating a central angular position pattern of the workpiece image according to the seventh embodiment of the invention;

FIGS. 43A and 43B are diagrams illustrating workpiece imaging which provides a basis for tilted angle detection by means of the conventional image processing apparatus;

DETAILED DESCRIPTION OF THE PREFERRED EMBODIMENTS

Now, a description will be give in more detail of embodiments of the present invention.

Figure 1A:
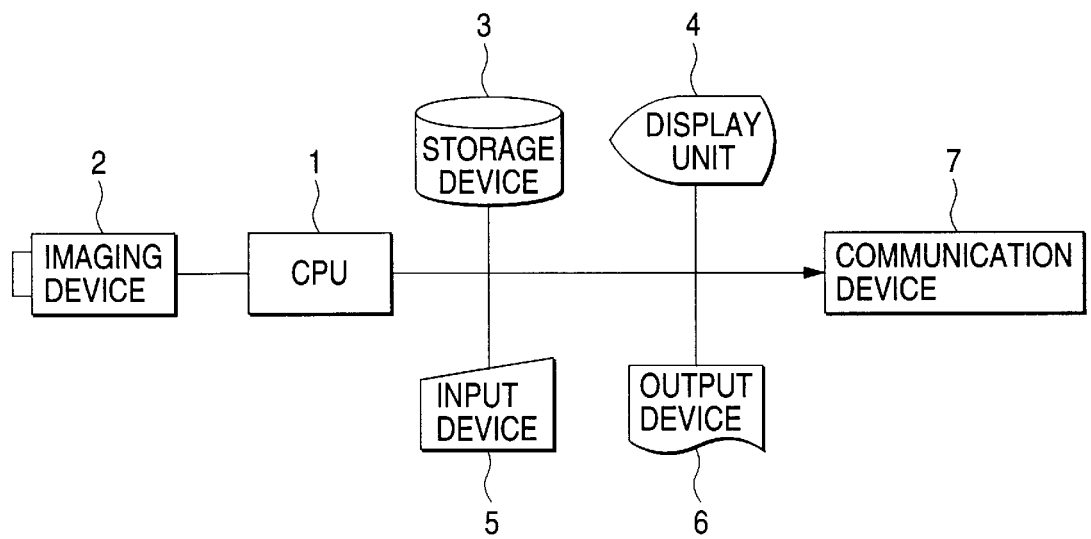
FIGS. 1A and 1B are schematic block diagrams showing an image processing apparatus according to a first embodiment of the present invention.
Figure 1B:
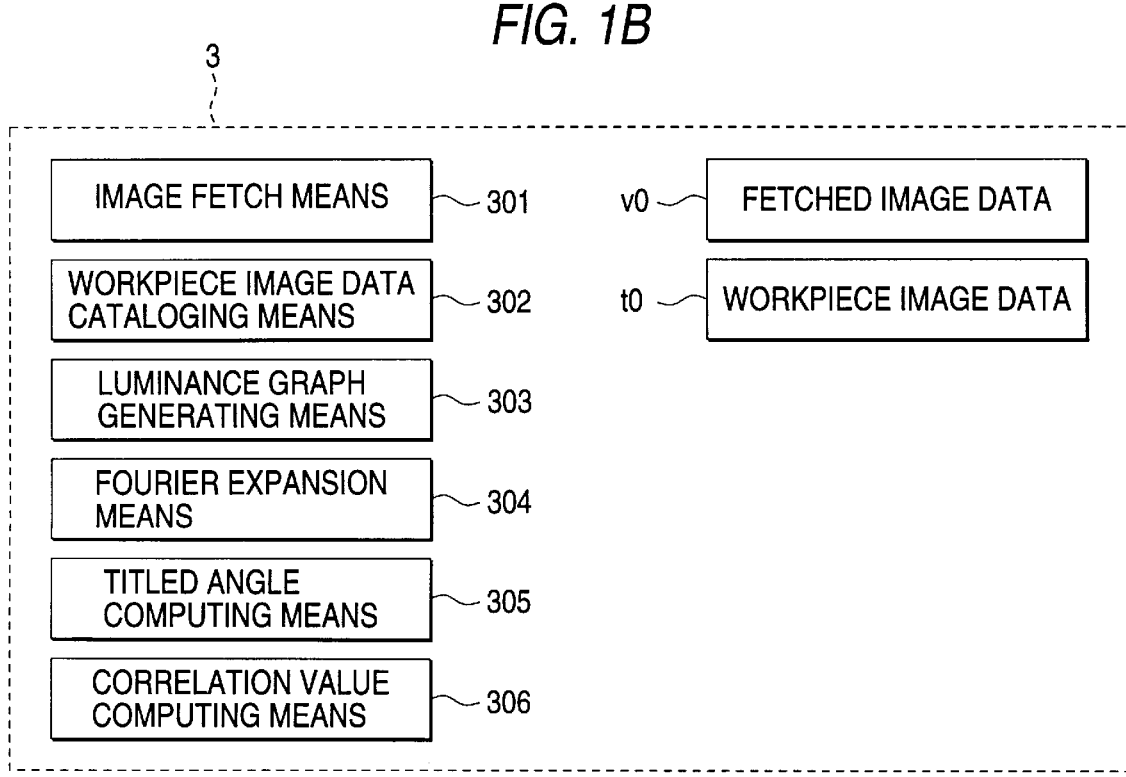

Embodiment 1:

Referring to FIGS. 1A–15, there will be given a description of a first embodiment of the present invention. FIGS. 1A and 1B are schematic block diagrams showing an image processing apparatus embodying the present invention. This apparatus comprises a central processing unit CPU 1 for performing control and arithmetic processes in the entire apparatus, an imaging device 2 for optically fetching an image of a workpiece as an object for detection, a storage device 3 for storing operational program data for the CPU 1 and results of operations, a display unit 4 for graphically displaying a position where a workpiece is detected on the basis of the results of operations performed by the CPU 1, an input device 5 for inputting data and command data to the CPU 1, an output device 6 for outputting the contents displayed on the display unit 4 in the form of characters and the like, a communication device 7 for transferring the detected position data to other devices, an image fetch means 301 for fetching the image stored in the storage device 3, a workpiece image data cataloging means 302 for cataloging image data on a workpiece as an object whose position and tilted angle are to be detected, a luminance graph generating means 303 for generating a plurality of luminance graphs by extracting the luminance of each pixel in the image data in the form of a concentric circle, a Fourier expansion means 304 as a characteristic value computing means for computing the initial term of Fourier series on a luminance graph basis by subjecting the plurality of luminance graphs thus generated to Fourier expansion in an angular direction, a tilted angle computing means 305 for computing the tilted angle of the workpiece using the initial term of Fourier series by means of workpiece image data t0 and the initial term of Fourier series by means of fetched image data v0, and a correlation value computing means 306 for computing the correlation value between the initial term of Fourier series by means of the workpiece image data t0 and the initial term of Fourier series by means of the fetched image data v0 so as to compute the position of the workpiece from the fetched image data v0.

Figure 13A:
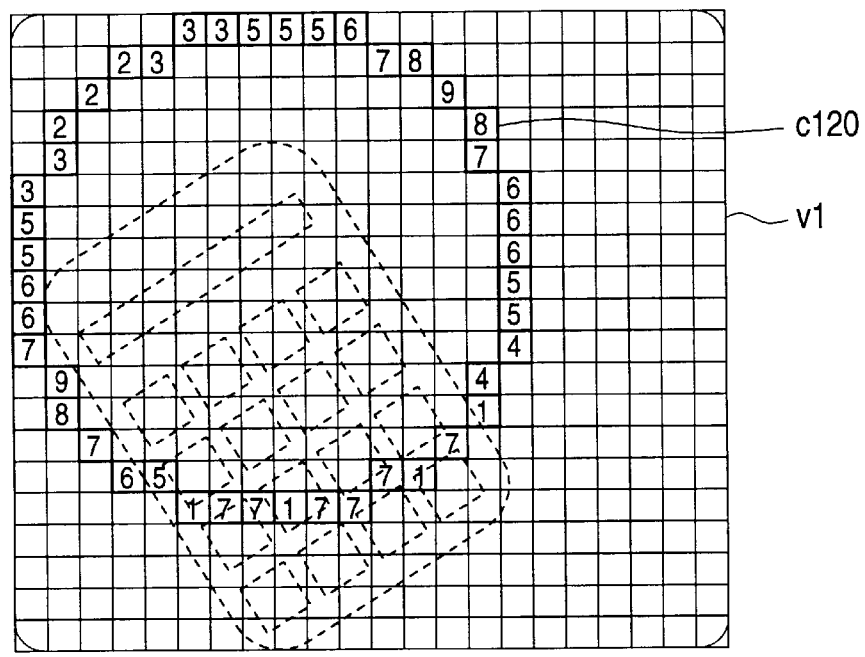
FIGS. 13A and 13B are diagrams illustrating the order of computing the correlated values according to the first embodiment of the invention.
Figure 13B:
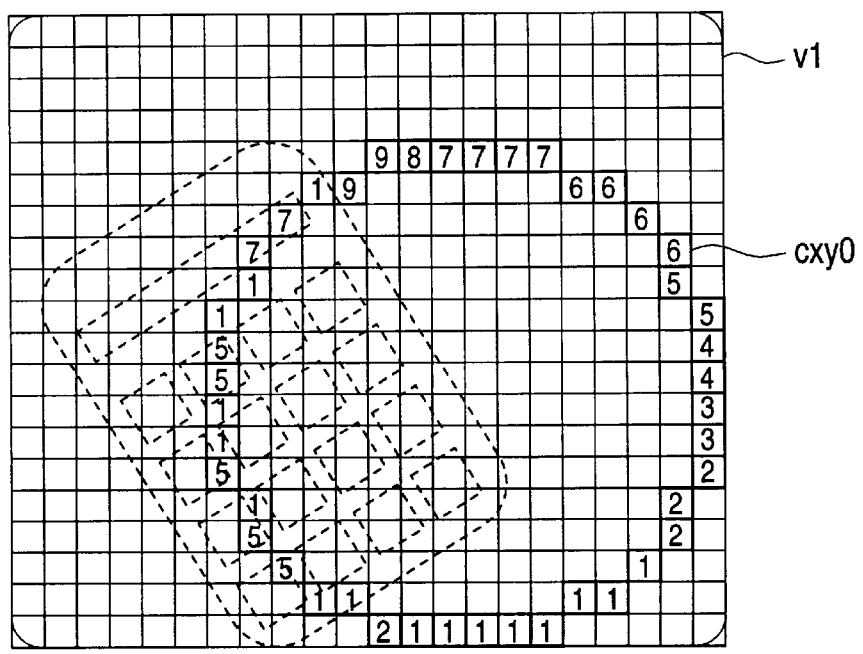
Figure 14A:
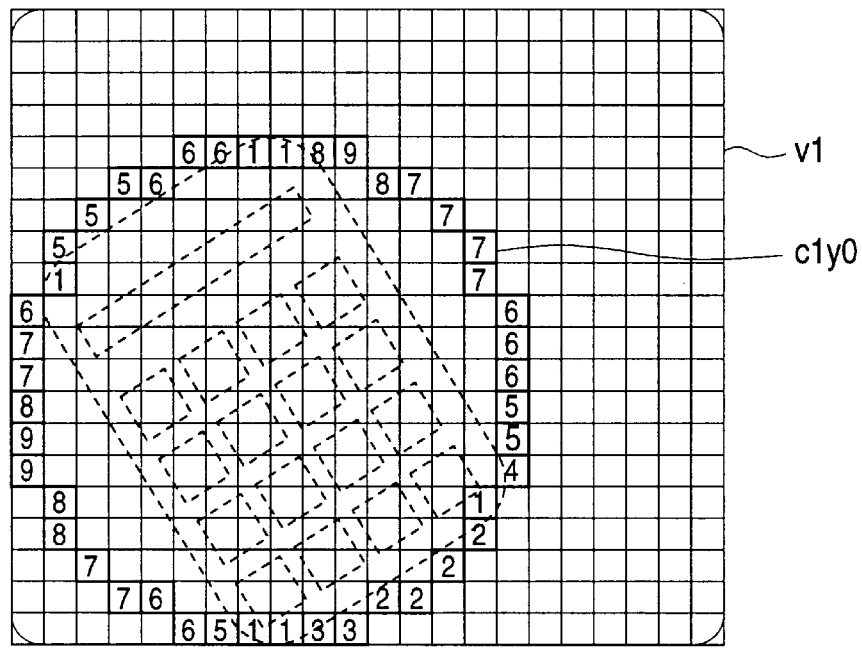
FIGS. 14A and 14B are diagrams illustrating a case where the position and tilted angle of the workpiece have been detected according to the first embodiment of the invention.
Figure 14B:
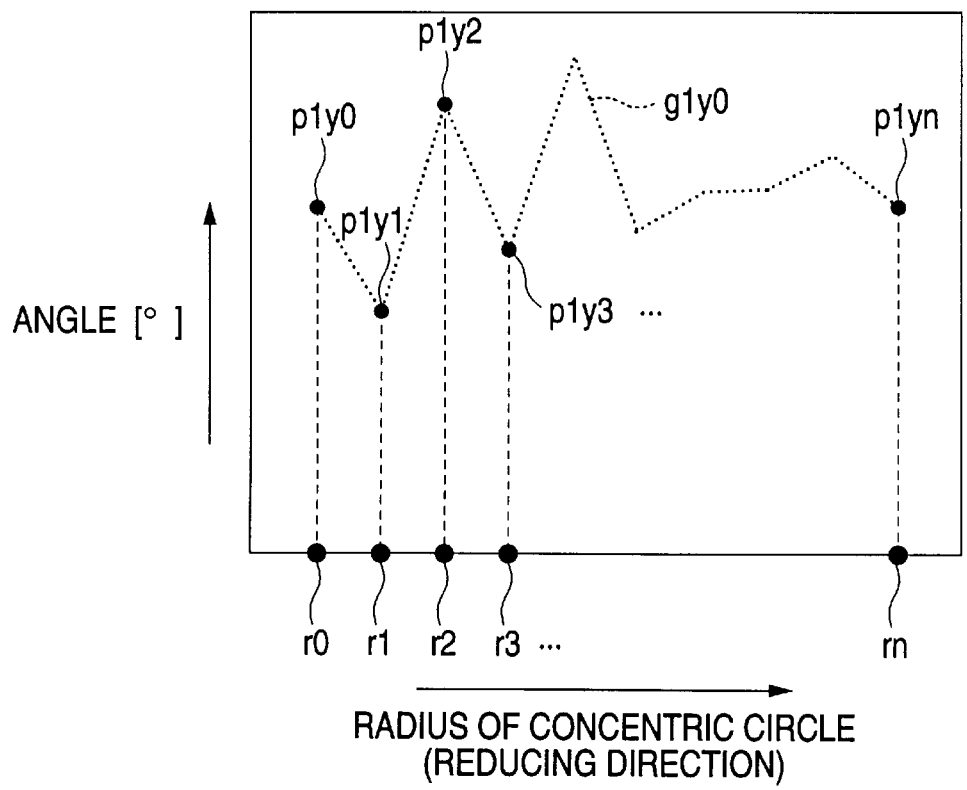
Figure 15:
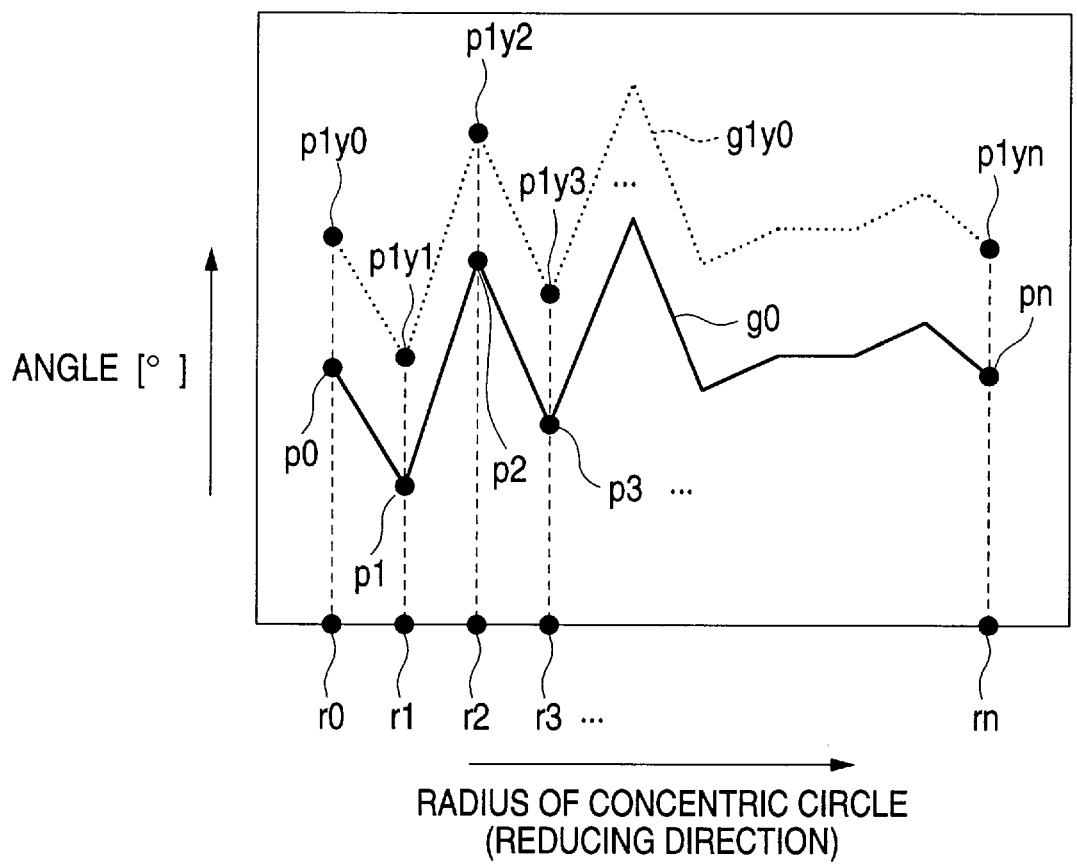
FIG. 15 is a diagram illustrating the central angular position pattern in a case where the position and tilted angle of the workpiece have been detected according to the first embodiment of the invention.

A description will subsequently be given of a method for detecting the tilted angle of a workpiece w1 of FIGS. 9A and 9B by cataloging a workpiece w0 of FIGS. 3A and 3B as the workpiece image data v0 in connection with the operation of the embodiment of the present invention based on the apparatus thus configured by reference to a flowchart of FIG. 2, diagrams of FIGS. 3A, 3B and 9A, 9B in a workpiece imaging mode, diagrams of FIGS. 4A–4C in a workpiece image data mode, diagrams of FIGS. 5A, 5B and 10A, 10B in a workpiece luminance graph mode, diagrams of FIGS. 6–8 and FIGS. 12A–14B in a Fourier expansion mode, and diagrams of FIGS. 11 and 15 in a correlation value computation mode.

Figure 2:
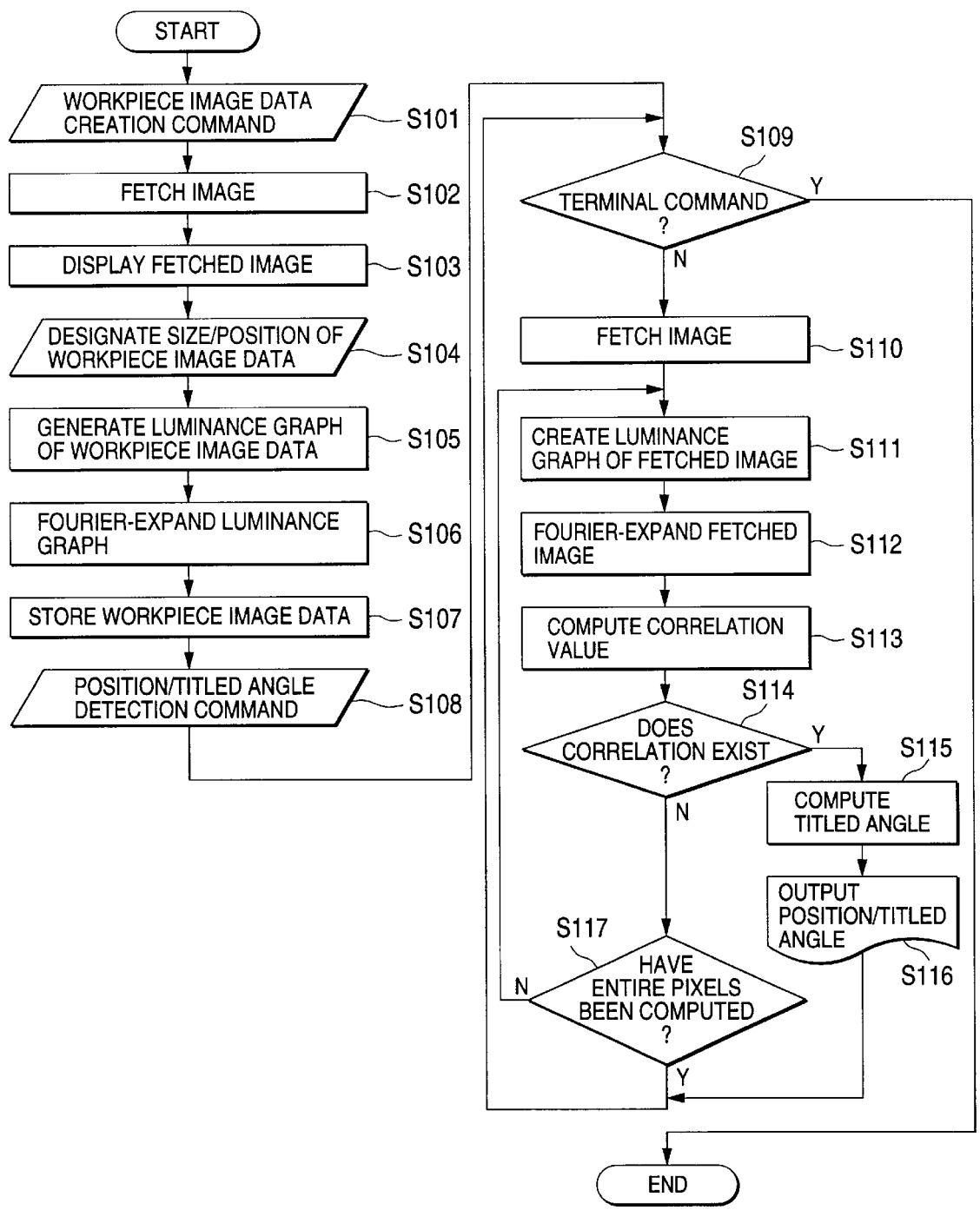
FIG. 2 is a flowchart showing the operation of the image processing apparatus according to the first embodiment of the invention.

At Step S101 in reference to a flowchart of FIG. 2, first, a workpiece image data command is input by the input device 5 (workpiece image data creation command).

Figure 3A:
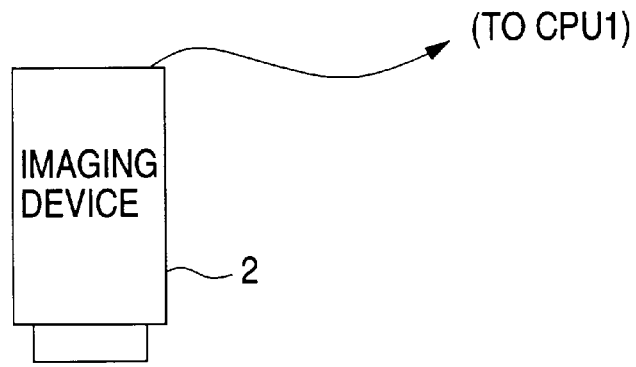
FIGS. 3A and 3B are diagrams illustrating workpiece imaging which provides a basis for tilted angle detection according to the first embodiment of the invention.

At Step S102 then, the CPU 1 starts the image fetch means 301 of the storage device 3 to fetch an image of the workpiece w0 shown in FIG. 3A from the imaging device 2 and stores the image as the image data v0 in the storage device 3 (fetching of image).

Figure 3B:
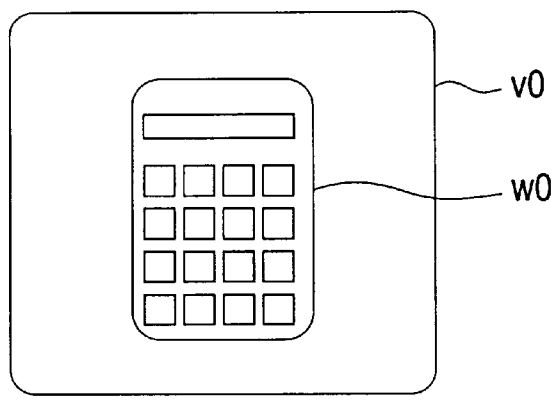

At Step S103, the CPU 1 displays on the display unit 4 the image data v0 shown in FIG. 3B (display of fetched image).

Figure 4A:
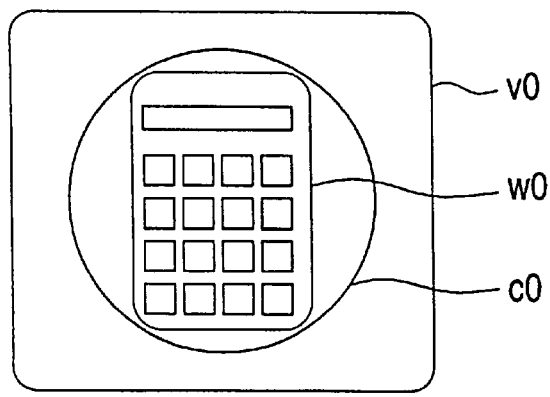
FIGS. 4A–4C are diagrams illustrating data structure of a workpiece image according to the first embodiment of the invention.

At Step S104, further, a workpiece image data size-position setting command is input by the input device 5 to make the CPU 1 display on the display unit 4 a circle c0 of a circular window frame of FIG. 4A showing the size-position of the workpiece image data. Then the CPU 1 designates the size-position data on the workpiece image data by inputting the radius of the circle c0, its central coordinate data and the like, so that the workpiece w0 stays within the circle c0 as shown in FIG. 4A (designation of size-position of workpiece image data).

Figure 4B:
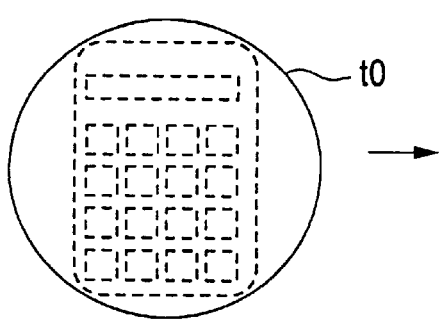
Figure 4C:
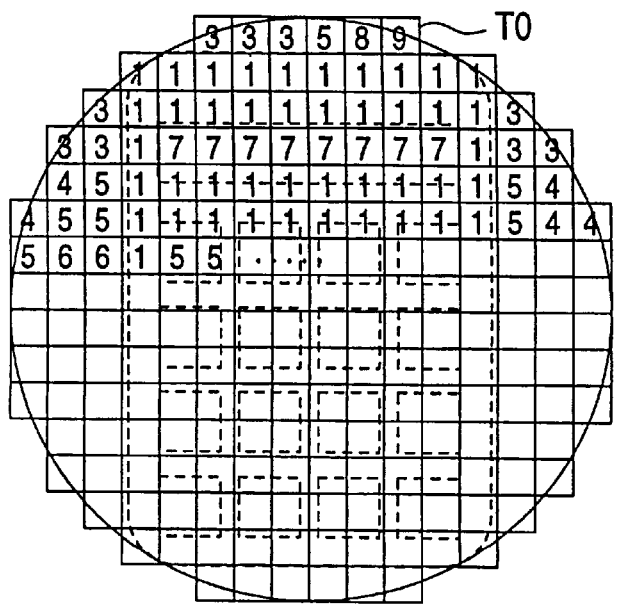

Further, the CPU 1 extracts the portion encircled by the circle c0 as the workpiece image data t0 of FIG. 4B from the image data v0. Workpiece image data T0 of FIG. 4C shows the data structure of the workpiece image data t0. The workpiece image data T0 is such that the inside of the circle is arranged in a grid-spaced form on a pixel basis to provide such a data structure as to let each grid have luminance data on each pixel. Numerical values 1, 3, 5, . . . denote the luminance values of luminance of the workpiece image data.

Figure 5A:
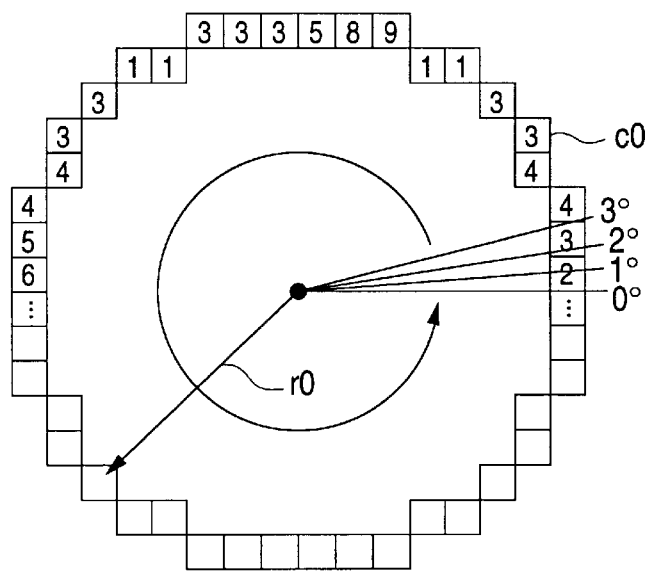
FIGS. 5A and 5B are diagrams illustrating a luminance graph of the workpiece image according to the first embodiment of the invention.
Figure 5B:
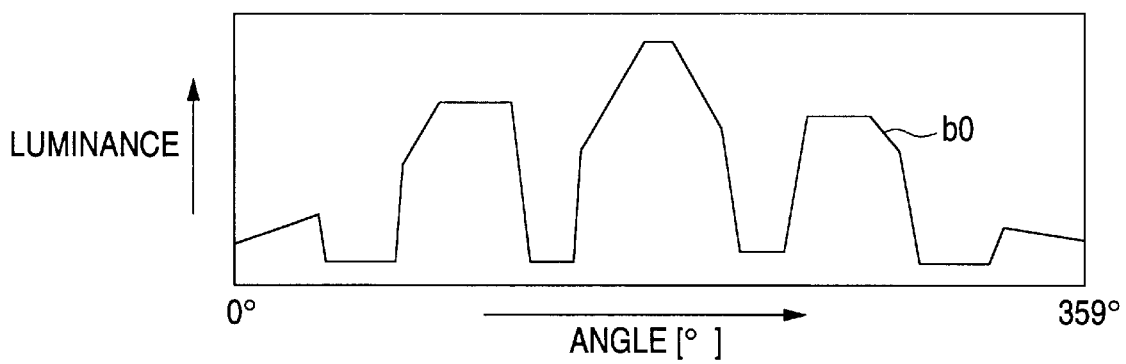

At Step S105, the CPU 1 extracts luminance data on the circle c0 corresponding to the outermost peripheral circle having the radius r0 of FIG. 5A from the luminance data of the workpiece image data t0 and generates luminance graphs b0 corresponding to 0–359° shown in FIG. 5B (generation of luminance graph of workpiece image data).

Figure 6:
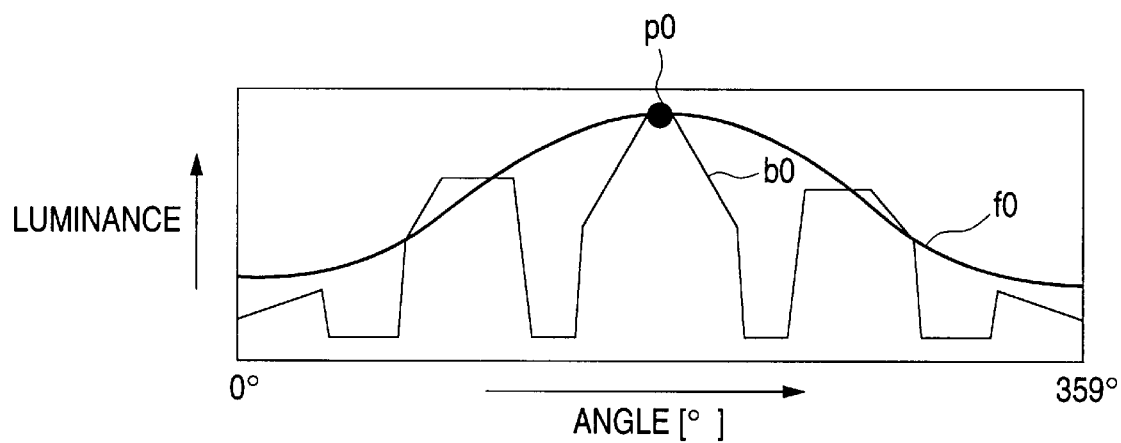
FIG. 6 is a graph illustrating the initial term of Fourier expansion of the workpiece image according to the first embodiment of the invention.

Thus the CPU 1 obtains an angle p0 when the value of Eq.(3) is 0 and when that of Eq.(4) is negative as an angle at which the initial term f0 of Fourier expansion of the luminance data as defined in Eq. (2) takes a maximum value as shown in FIG. 6 with respect to Eq.(3) resulting from differentiating Eq.(2) once of the initial term f0 of Fourier expansion obtainable from the luminance graph b0 in terms of an angle θ and Eq. (4) resulting from differentiating Eq. (2) twice likewise as shown below, the angle p0 thus obtained being stored in the storage device 3.

$$f0(\theta) = A - B \times \cos\theta - C \times \sin\theta \quad (2)$$

$$d(f0(\theta))/d\theta = B \times \sin\theta - C \times \cos\theta \quad (3)$$

$$d(d(f0(\theta))/d\theta)/d\theta = B \times \cos\theta + C \times \sin\theta \quad (4)$$

In this case, the coefficients A, B, C in Eqs. (2)–(4) are computed with Eqs. (5)–(7). A constant π in Eqs. (6)–(7) is a circle ratio (3.1415926 . . . ); the sin in Eqs. (2)–(7) a sine function; and the cos therein a cosine function. The symbol d in Eqs. (3) and (4) represents differentiation.

[Numerical Formula 2] (5)

$$A = (1/360) \times \sum_{i=0}^{359} (b0(i))$$

[Numerical Formula 3] (6)

$$B = (1/180) \times \sum_{i=0}^{359} \{b0(i) \times \cos(\pi \times i/180)\}$$

[Numerical Formula 4] (7)

$$C = (1/180) \times \sum_{i=0}^{359} \{b0(i) \times \sin(\pi \times i/180)\}$$

Figure 7A:
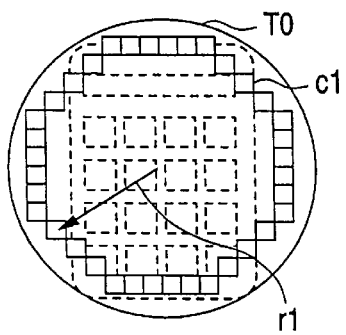
FIGS. 7A–7F are graphs illustrating the initial term of Fourier expansion of the workpiece image according to the first embodiment of the invention.
Figure 7B:
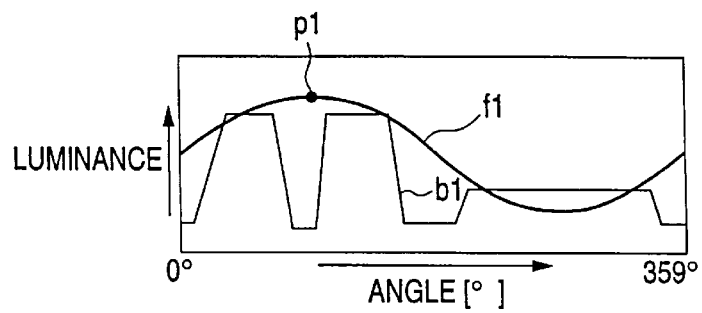
Figure 7C:
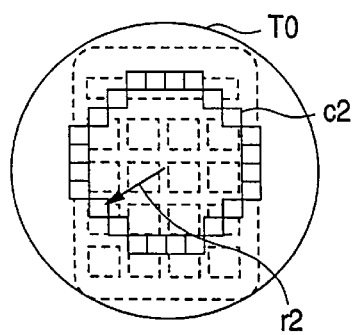
Figure 7D:
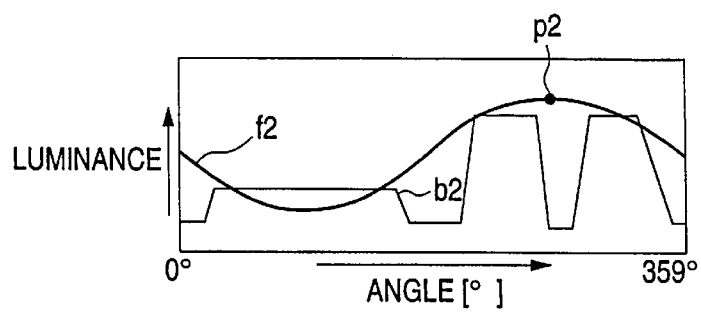
Figure 7E:
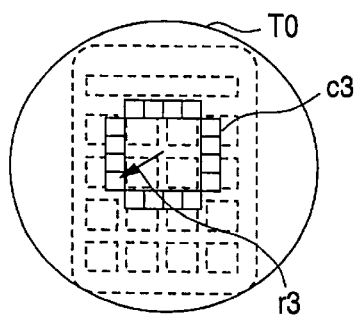
Figure 7F:
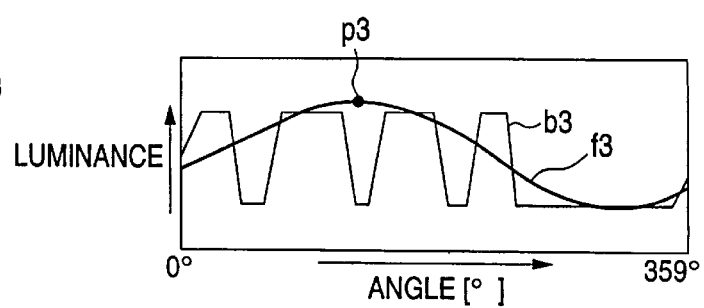

At Step S106, as shown in FIG. 7A–7B, further, in reference to a circle c1 which is concentric with the circle c0 and has a radius smaller by one pixel than that of the circle c0, an angle p1 at which the initial term f1 of Fourier expansion takes a maximum value with respect to luminance b1 on the circle c1 is also computed by the Fourier expansion as in the case of the circle c0 of FIG. 6. Similarly, angles p2 and p3 with respect to circles c2 and c3 whose radii are smaller by one pixel are successively computed as shown in FIGS. 7C–7D. and 7E–F. By decreasing the radius of the window by one pixel from r0 each time, the maximum value of the initial term of Fourier expansion of luminance with respect to each radius, so that a graph g0 of angles of FIG. 8 computed from n of concentric circles created by a central angular position pattern computing means is stored in the storage device 3. In this case, the number n of concentric circles is what is less by one than a value resulting from dividing the radius r0 of the circle c0 by the dimension of one pixel (Fourier expansion of luminance graph).

At Step S107, the CPU 1 stores a graph g0 of angles and radii as the workpiece image data t0 in the storage device 3 (cataloging of workpiece image data).

At Step S108, further, a position-tilted angle detection command and the threshold value s0 of the correlation value s between the workpiece image data t0 and the fetched image data are input by the input device 5. The threshold value s0 of the correlation value is set so that only a greater correlation value is detected: for example, 90% of the maximum value of the correlation value s that can be taken (position-tilted angle detection command).

Steps from Step S109 up to Step S117 thereafter are to be repeated, whereupon a termination command is input by the input device 5 when processing interruption is needed (termination command is given).

Figure 9A:
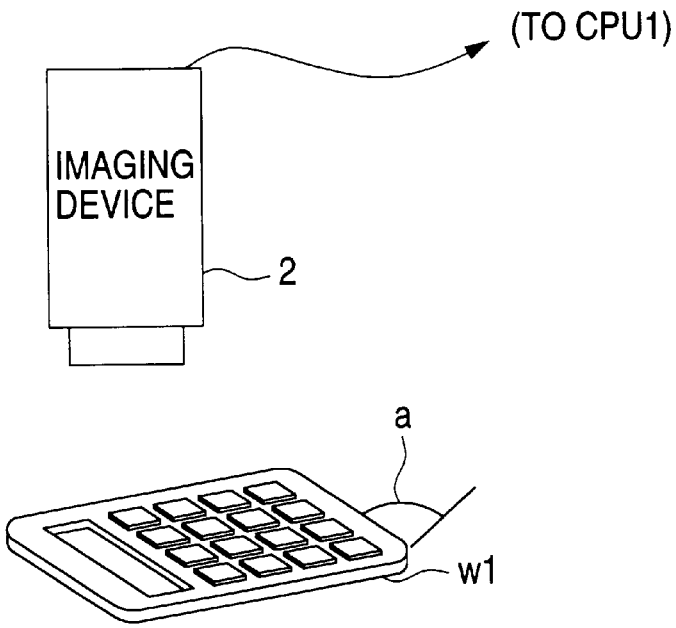
FIGS. 9A and 9B are diagrams illustrating the picking-up of a fetched image of an object for detection which is tilted from a reference line according to the first embodiment of the invention.

At Step S110, the CPU 1 starts the image fetch means 301 of the storage device 3 similarly as shown at Step S102, fetches the image of the workpiece w1 shown in FIG. 9A from the imaging device 2 and stores the workpiece image as the fetched image data v1 in the storage device 3. As shown in FIG. 9B, the workpiece w1 is assumed as what is tilted by an angle of a from a reference line in contrast to the workpiece w0 (fetching of image).

Figure 10A:
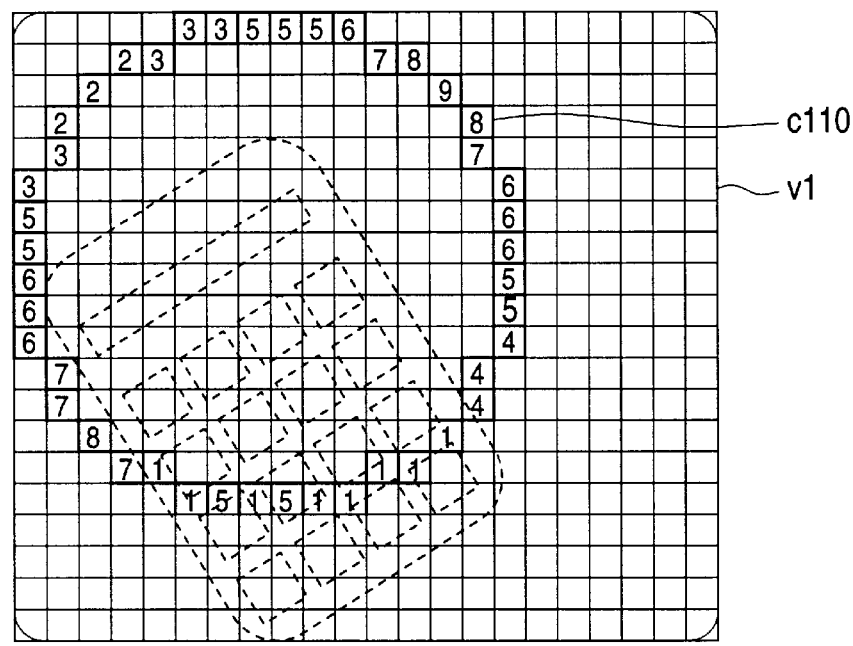
FIGS. 10A and 10B are diagrams illustrating the generation of the central angular position pattern of the object for detection which is tilted from the reference line according to the first embodiment of the invention.
Figure 11:
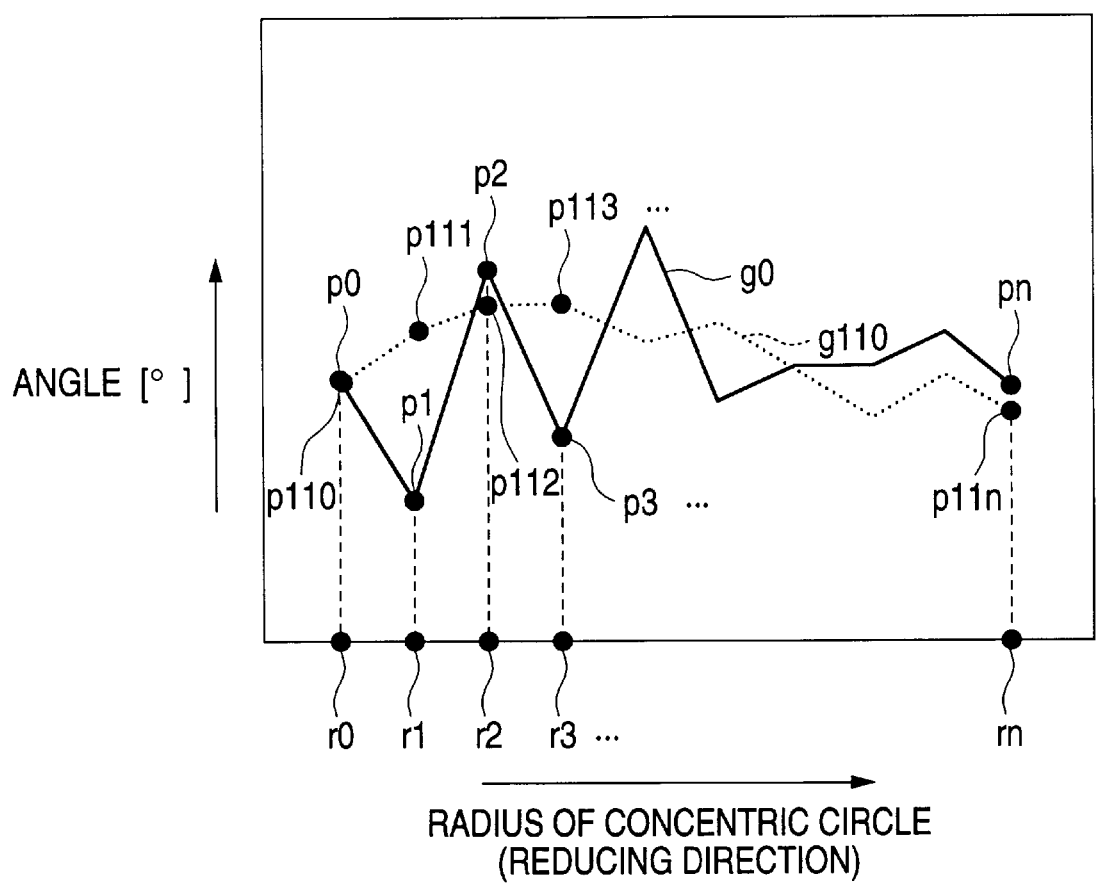
FIG. 11 is a graph illustrating the computation of correlated values between the workpiece image and the central angular position pattern of the fetched image according to the first embodiment of the invention.

At Step S111, the CPU 1 forms on the fetched image data v1 a circle c110 having the same radius r0 as that of the circle c0 as shown in FIG. 10A and creates a luminance graph similarly as shown in FIGS. 5A and 5B from the luminance data on each pixel. Further, the CPU 1 creates a luminance graph of radii of not greater than r0 similarly as shown at Step S105 (creation of luminance graph of fetched images).

Figure 10B:
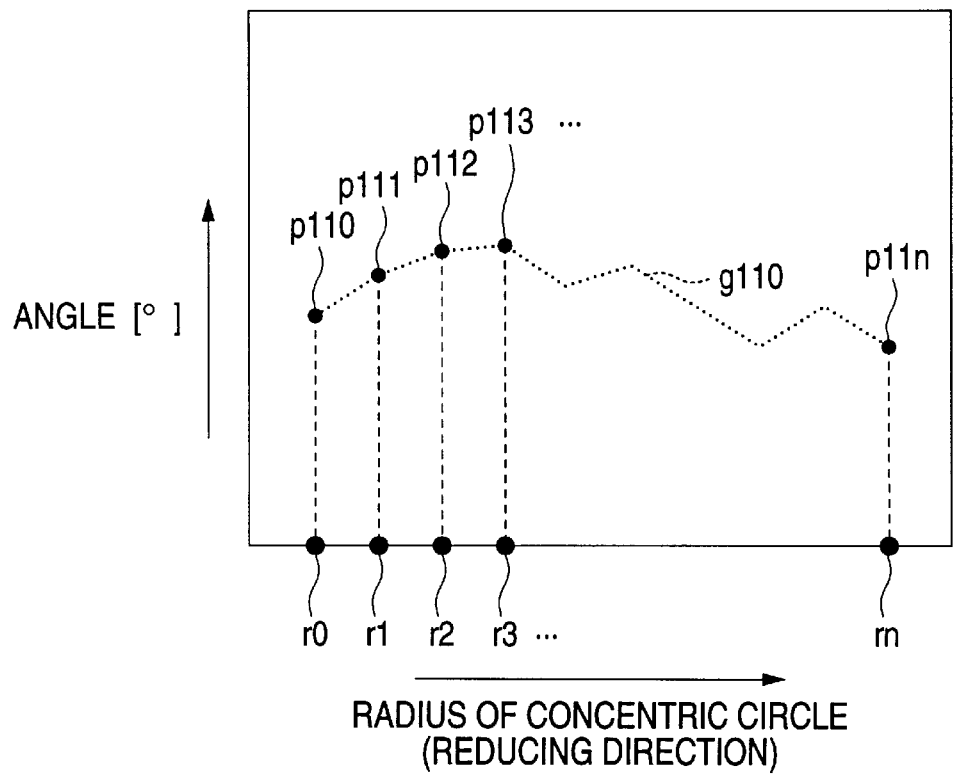

At Step S112, subsequently, the CPU 1 creates a graph g110 of angles of the image data v1 fetched by the central angular position pattern computing means like the graph g0 of angles of the workpiece image data t0 obtained at Step S106 as shown in FIG. 10B (Fourier expansion of fetched image).

Figure 8:
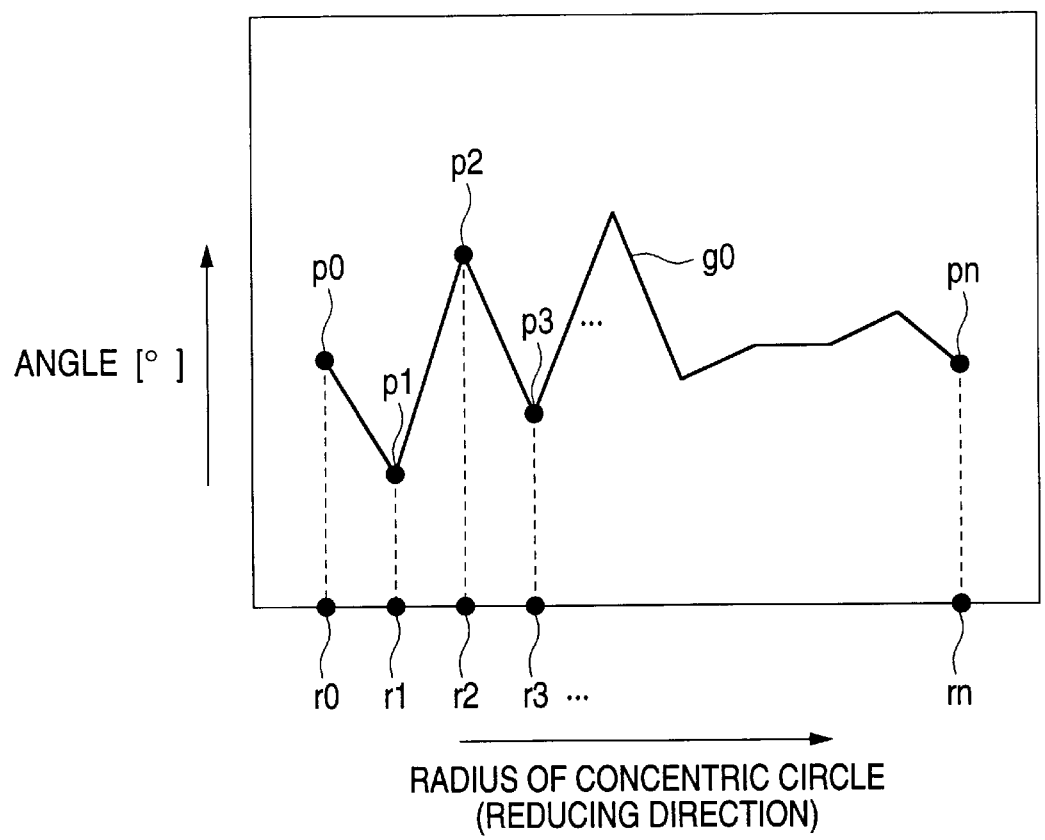
FIG. 8 is a graph illustrating a central angular position pattern of the workpiece image according to the first embodiment of the invention.
Figure 9B:
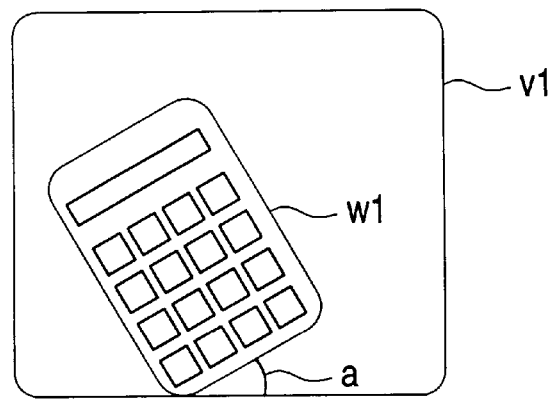

At Step S113, the CPU 1 computes the correlation value s between the workpiece image data t0 and the fetched image data v1 using the following equation (8) by reference to not only the graph g00 of angles of the workpiece image data t0 shown in FIG. 8 but also the graph g110 of angles of the fetched image data v1 stored in the storage device 3.

[Numerical Formula 5] (8)

$$s = \sqrt{\left\{\sum_{i=0}^{n-1} \sin(pi - p11i)\right\}^2 + \left\{\sum_{i=0}^{n-1} \cos(pi - p11i)\right\}^2 \Big/ n}$$

Where the symbol p represents an angle on the graph g0 of angles of the workpiece image data t0; and p11, an angle on the graph g110 of angles of the fetched image data v1. Further, the symbol n represents the number of concentric circles c0, c1, ...; and n, a value smaller by 1 than the value resulting from dividing the radius r0 of the circle c0 by the pixel dimension as shown at Step S106 (correlation value computation).

At Step S114, further, the CPU 1 decides that when the correlation value s is greater than the threshold value s0, the workpiece image data t0 correlates with the fetched image data v1. For example, the graph g0 and the graph g110 differ in form as shown in FIG. 11, so that no correlation exists between them as the correlation value s becomes smaller than the correlation value s0 (correlation exists).

At Step S115, the CPU 1 computes a tilted angle a from the following equation (9) when the correlation is judged existent at Step S114 (tilted angle computation). In this case, $\tan^{-1}$ is an inverse tangent function.

[Numerical Formula 6] (9)

$$a = \tan^{-1}\left[\sum_{i=0}^{n-1} \sin(pi - p11i) \Big/ \sum_{i=0}^{n-1} \cos(pi - p11i)\right]$$

At Step S116, further, the CPU 1 types the position and tilted angle a or feeds them into the communication device 7 and returns to Step S109 when the correlation is judged existent at Step S114. FIG. 14A shows a circle c1y0 on the fetched image in the presence of the correlation; FIG. 14B, a graph g1y0 of angles; and FIG. 15 correlation value computation. The graph g0 of angles of the workpiece image and the graph g1y0 of angles of the fetched image are similar in form to each other and formable by displacing one of them to the other in parallel, the quantity of that parallel displacement conforming to the angle a desired. As shown at Step S109, the CPU 1 terminates the processing when the termination command is given (outputting of position-tilted angle).

Figure 12A:
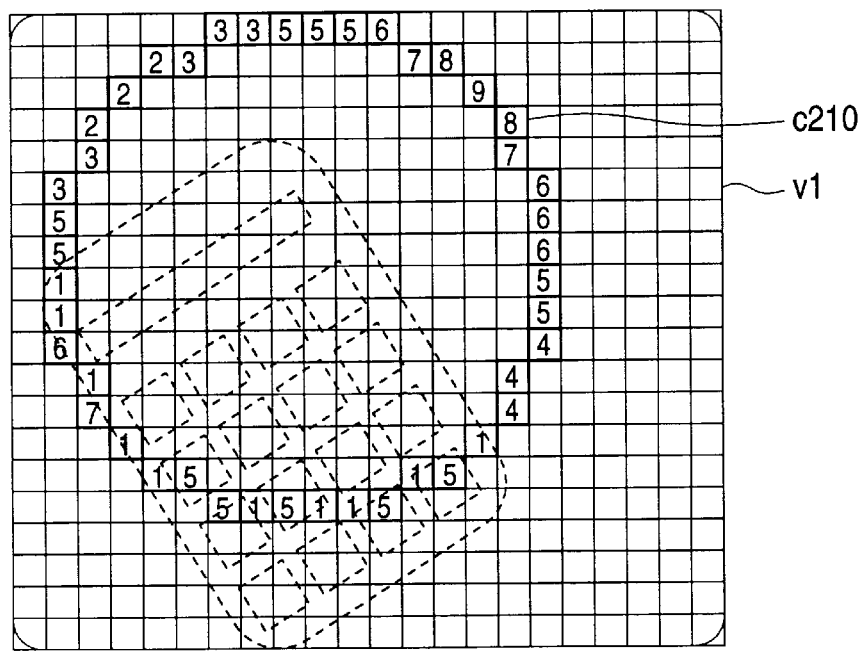
FIGS. 12A and 12B are diagrams illustrating the order of computing the correlated values according to the first embodiment of the invention.
Figure 12B:
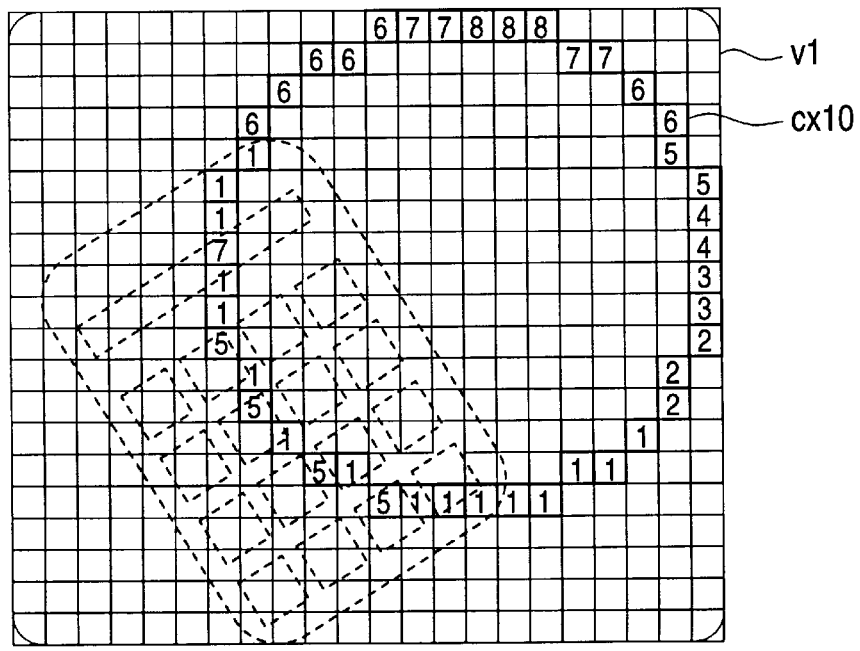

In the absence of the correlation at Step S117, the CPU 1 creates a circle c210 by shifting the circle c110 by one pixel in the x direction as shown in FIG. 12A and as in the case of the circle c110, repeats the steps from Step S111. Further, the CPU 1 repeats the steps from Step S111 while shifting the circle by one pixel in the x direction, shifts the circle in the y direction pixel by pixel as shown in FIG. 13A on terminating the shifting operation of one line in the x direction as shown in FIG. 12B and returns to Step S109 after reaching the final pixel as shown in FIG. 13B. The CPU 1 terminates the processing when the termination command is given as shown at Step S109 (termination of computing the entire pixel).

In this embodiment of the present invention, it is thus intended to recognize the position and tilted angle of a workpiece image as an object for detection by creating a circular window accommodating a reference image of the workpiece image in an area including the workpiece image as the object thereof while vertically and horizontally shifting the window pixel by pixel within the detection area. Further, the circular window is divided step by step into a plurality of concentric circles different in radius and luminance of a plurality of pixels distributed in each concentric circular area is subjected to Fourier expansion with respect to an angle θ and besides an angle at which the initial term of Fourier series takes a maximum value is obtained. Then a central angular position pattern as a graph of angles is created by plotting out angles taking the maximum value on the graph with the radius of the concentric circle as the abscissa axis and the angle θ as the ordinate. More specifically, the form of the center-angle-position pattern is compared with what is obtained with respect to the reference image and if these forms conform to each other when they are displaced in parallel, for example, an object for detection is to be located at that point of coincidence and the angle at which they are moved in parallel is equivalent to the tilted angle. Thus the position and tilted angle of the workpiece can be computed in a short time.

Figure 16A:
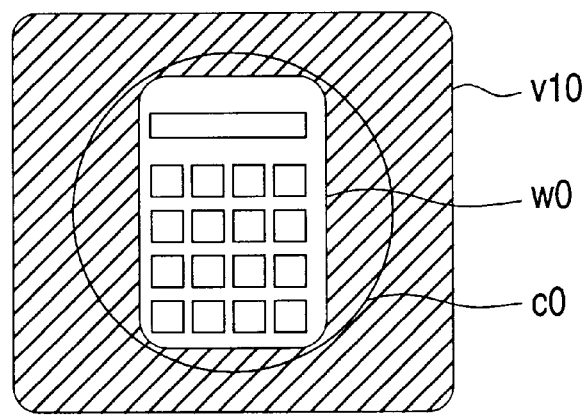
FIGS. 16A and 16B are diagrams illustrating the operation of a luminance graph generating means according to a second embodiment of the invention.
Figure 16B:
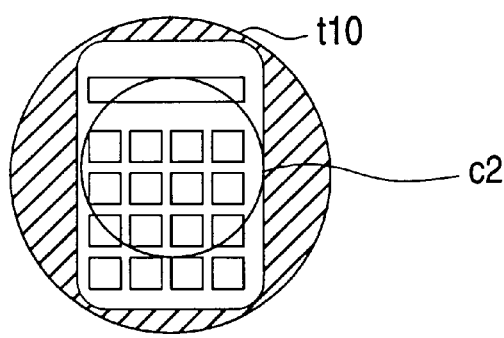

Embodiment 2:

Referring to FIGS. 16A and 16B, there will be given a description of a second embodiment of the present invention. In a case where the background of an image data v10 with respect to the workpiece w0 has a pattern with slanting lines as shown in FIG. 16A, thus causing a tilted angle detection error, the use of only luminance data within the circle c2 in workpiece image data t10 as shown in FIG. 16B prevents such a tilted angle detection error.

At Step S104 of FIG. 2, first, the radius r2 of the circle c2 showing the maximum circular area of luminance data for use is input by the input device 5. At Step S105 then, the CPU 1 starts the luminance graph generating means 303 of the storage device 3 and forms a luminance graph only with luminance data in the circle c2. In a case where a hole has been bored in the center of the workpiece w0, moreover, the CPU 1 creates a luminance graph by inputting the minimum radius of the circle to exclude any pixel in the hole portion of the circle (generation of luminance graph of workpiece image data). Then the processing thereafter is performed like what is performed after Step S106 of FIG. 2.

Thus the portions which often allow errors in the recognition of the object for detection such as the background image, the central hole and the like can be excluded, so that accuracy in the recognition of such an object for detection can be improved.

Figure 17A:
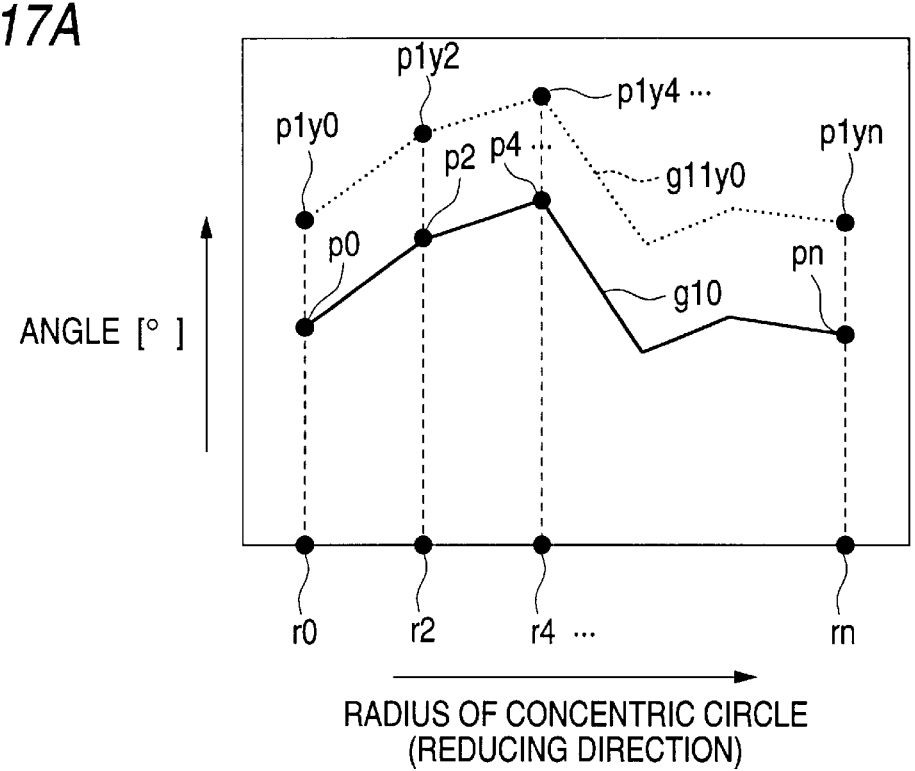
FIGS. 17A and 17B are diagrams illustrating the generation of a central angular position pattern according to a third embodiment of the invention.
Figure 17B:
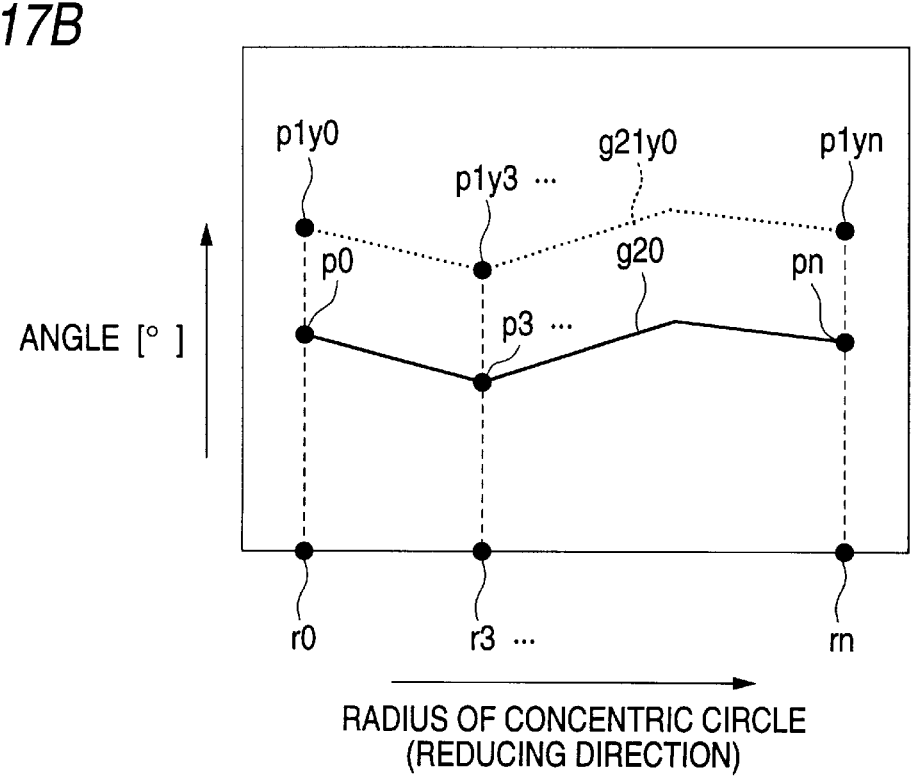

Embodiment 3:

Referring to FIGS. 17A and 17B, there will be given a description of a third embodiment of the present invention. In a case where there is allowance for accuracy in detecting the tilted angle at Step S105 of FIG. 2, the points on the graph of angles are thinned out in accordance with the thinning ratio fed by the input device 5 so as to shorten the processing time taken by the luminance graph generating means 303. FIG. 17A shows an example of a thinning ratio of 50% and FIG. 17B that of a thinning ratio of 33% (generation of luminance graph of workpiece image data).

When there is allowance for accuracy in detecting the position and tilted angle of the object for detection, the time required for recognizing the object for detection can be reduced by decreasing the quantity of data for use in creating the center-angle-position pattern.

Figure 18A:
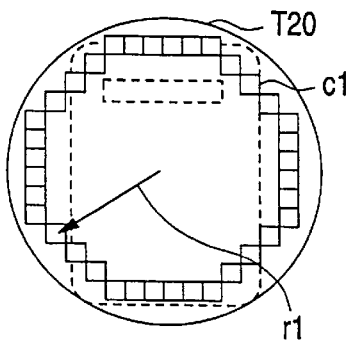
FIGS. 18A–18F are diagrams illustrating the operation of a tilted angle computing means according to a fourth embodiment of the invention.
Figure 18B:
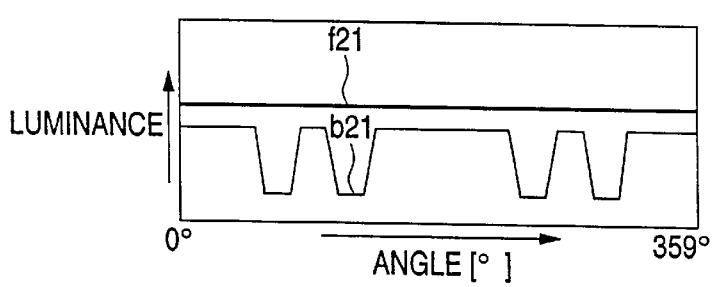
Figure 18C:
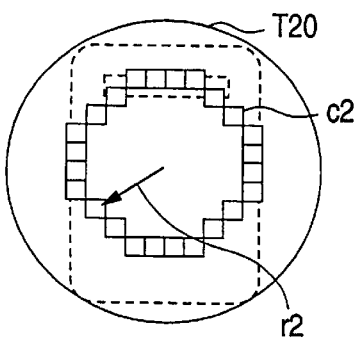
Figure 18D:
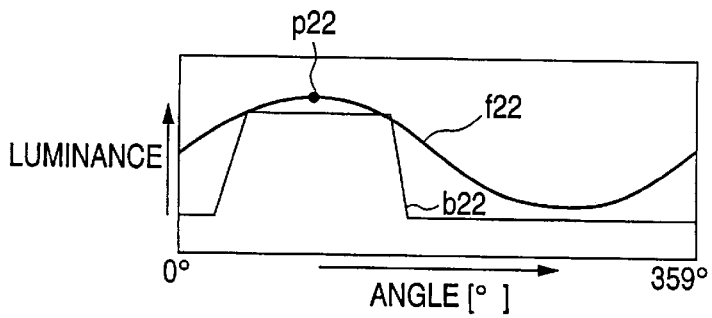
Figure 18E:
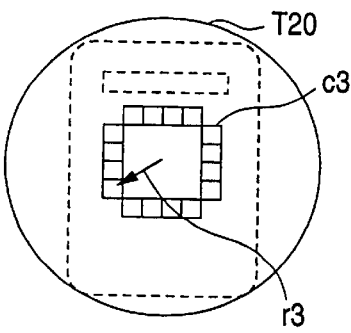
Figure 18F:
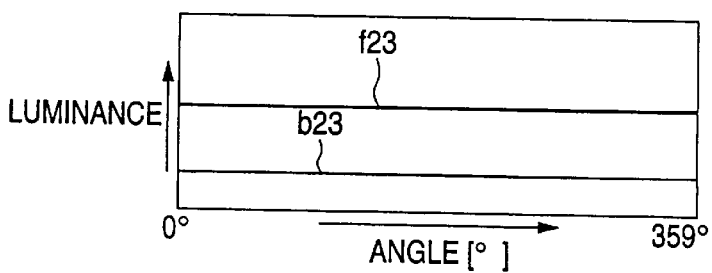
Figure 19A:
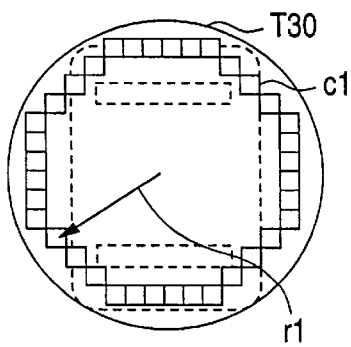
FIGS. 19A–19F are diagrams illustrating the operation of a tilted angle computing means according to a fifth embodiment of the invention.
Figure 19B:
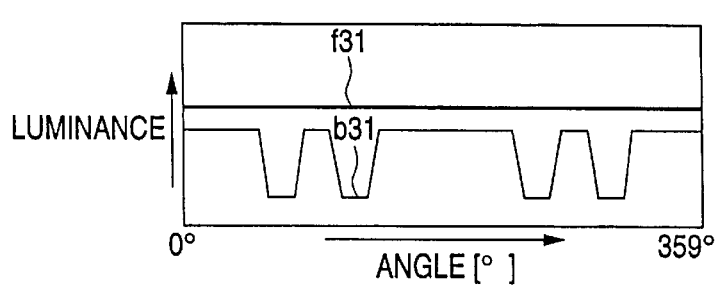
Figure 19C:
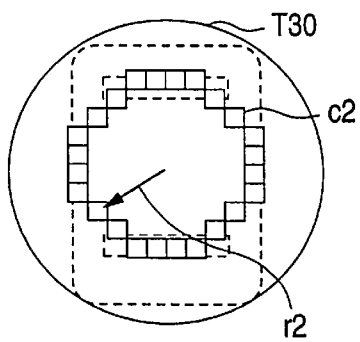
Figure 19D:
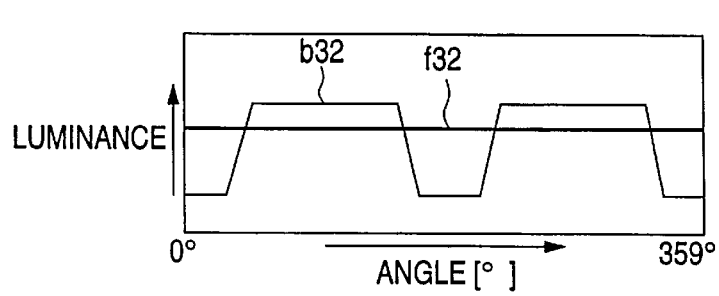
Figure 19E:
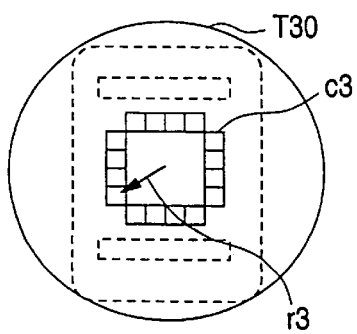
Figure 19F:
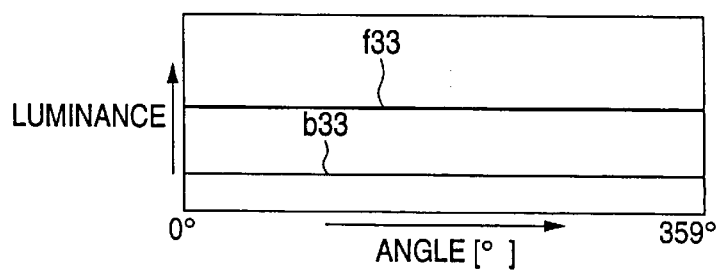

Embodiment 4:

Referring to FIGS. 18A–18F, there will be given a description of a fourth embodiment of the present invention. At Step S115 of FIG. 2, the CPU 1 creates a graph of angles by collecting only maximum values p22 that can be specified as shown in FIG. 18D and uses the graph as data for computing the correlation value s when it starts the tilted angle computing means 305 to compute angles but fails to specify any maximum value because the initial terms f21, f23 of Fourier expansion become flat, whereby the fluctuation is brought to 0 as shown in FIGS. 18A, 18B, 18E and 18F (tilted angle computation). The processing thereafter is performed similarly at and after Step S116 of FIG. 2.

As shown in FIGS. 19A–19F, however, the workpiece is judged or decided as what has a form whose tilted angle is undetectable such as what is symmetric with respect to point because the maximum value cannot be specified when all the initial terms including the initial terms f21, f22, f23 of Fourier expansion become flat, whereby the fluctuation is brought to 0 (tilted angle computation).

Since data including 0 causes the recognition accuracy to lower, the formation of such a central angular position pattern without the data may result in increasing the recognition accuracy. In a case where the entire data is 0, moreover, the formation of the central angular position pattern becomes meaningless, whereupon recognition efficiency can be raised by deciding that the formation of the central angular position pattern is unnecessary in this case.

Figure 20A:
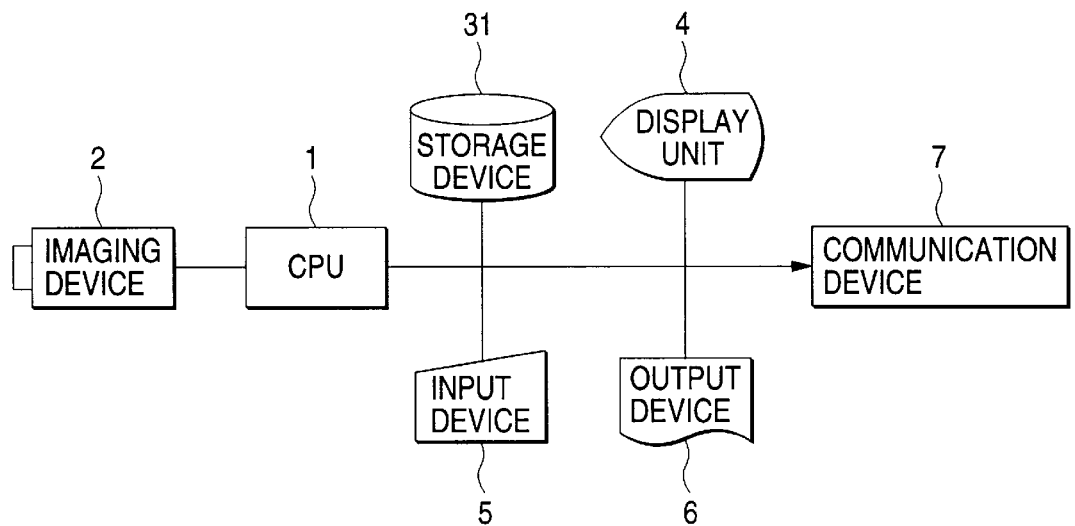
FIGS. 20A and 20B are schematic block diagrams showing an image processing apparatus according to a fifth embodiment of the present invention.
Figure 20B:
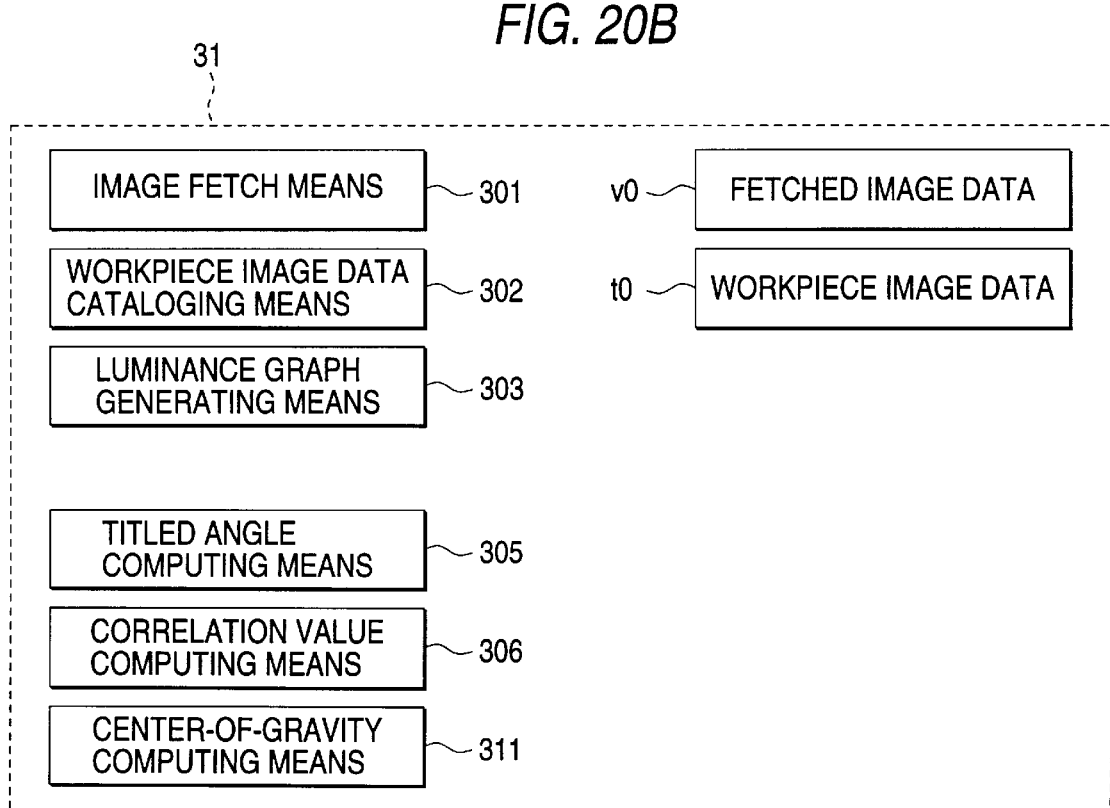
Figure 21:
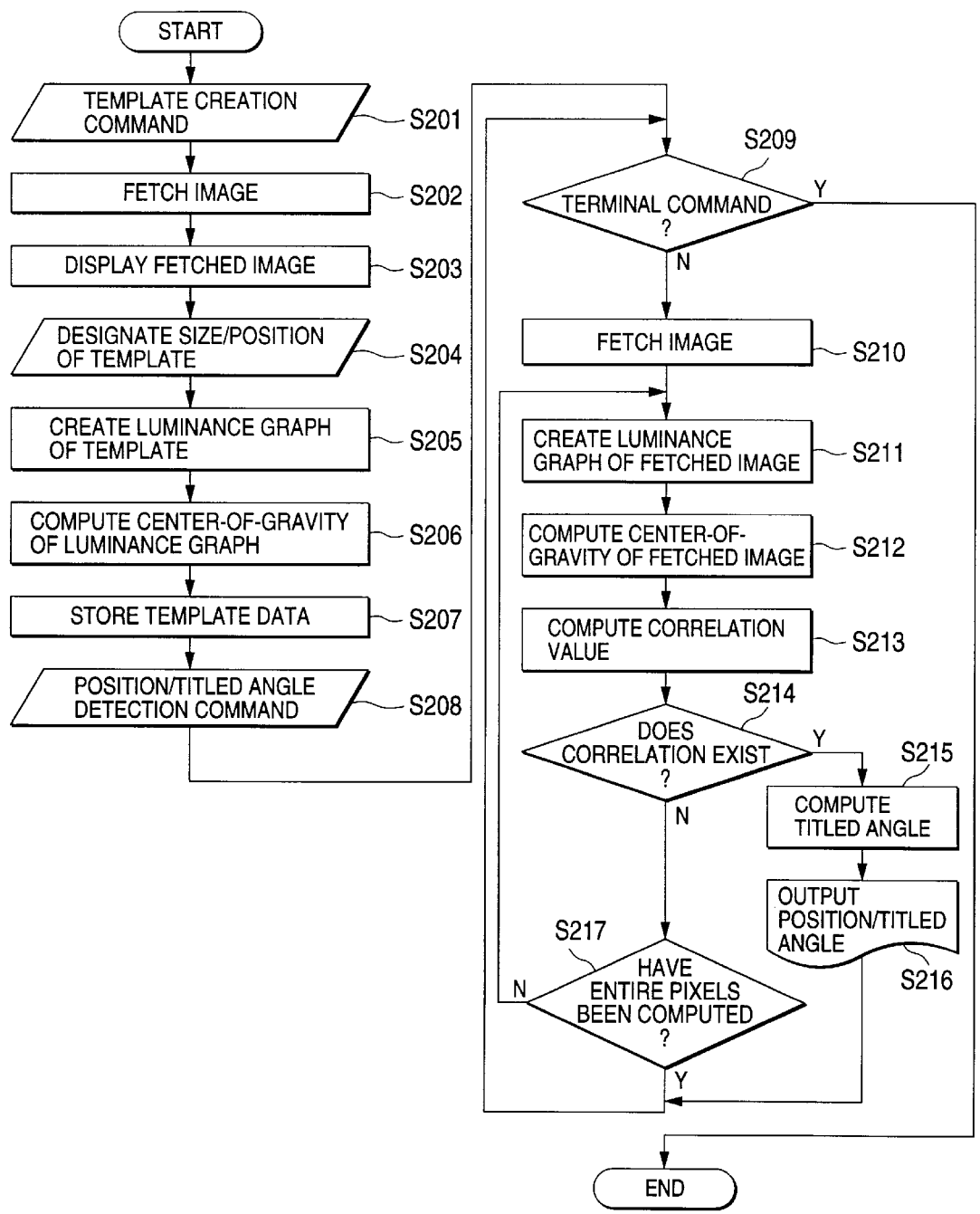
FIG. 21 is a flowchart showing the operation of the image processing apparatus according to the fifth embodiment of the invention.
Figure 22:
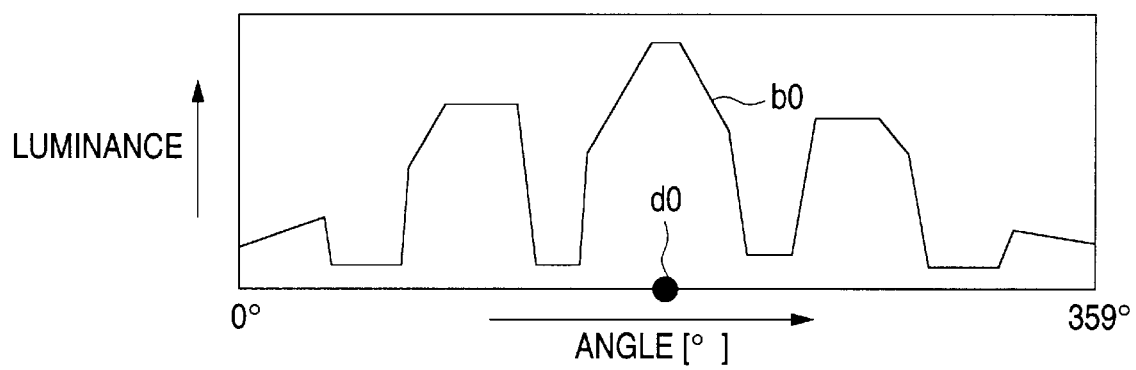
FIG. 22 is a diagram illustrating the computation of the center of the gravity position of luminance according to the fifth embodiment of the invention.

Embodiment 5:

Referring to FIGS. 20A–22, there will be given a description of a fifth embodiment of the present invention. FIGS. 20A and 20B are schematic block diagrams illustrating an image processing apparatus according to this embodiment of the invention and this image processing apparatus is different from what is shown in FIGS. 1A and 1B in that a storage device 31 is equipped with a center-of-gravity computing means 311 as a characteristic value computing means in place of the Fourier expansion means 304. In a flowchart of FIG. 21, the center of gravity in the luminance graph instead of Fourier expansion therein is computed at Step S206. As shown in FIG. 22, the center of gravity d0 is computed from the following equation (10) and when the graph g0 of FIG. 8 is formed, angular positions d0 - dn of the center of gravity instead of the maximum angular positions p0 - pn of Fourier expansion are employed (computation of the center of gravity on luminance graph). The computation is then carried out likewise at the time the center of gravity of the fetched image is computed at Step S212.

$$d0=(180/\pi)\times\arccos(x/r) \quad (10)$$

In this case, arccos designates an inverse trigonometric function and when the symbol y shown below is positive, $-\pi/2 < d0 < \pi/2$, whereas when it is negative, $d0 \leq -\pi/2$ or $\pi/2 \leq d0$: x is given by an equation (11); y by an equation (12); and r by an equation (13).

[Numerical Formula 7] \quad (11)

$$x = \sum_{i=0}^{n-1} \{b0(i) \times \cos(\pi \times i/180)\}$$

[Numerical Formula 8] \quad (12)

$$y = \sum_{i=0}^{n-1} \{b0(i) \times \sin(\pi \times i/180)\}$$

[Numerical Formula 9] \quad (13)

$$r = \sqrt{x^2 + y^2}$$

Thus the advantage is that the use of the position of the center of gravity makes the time required to recognize the position and tilted angle of an object for detection shorter than what is required in the case of Fourier expansion.

Figure 23A:
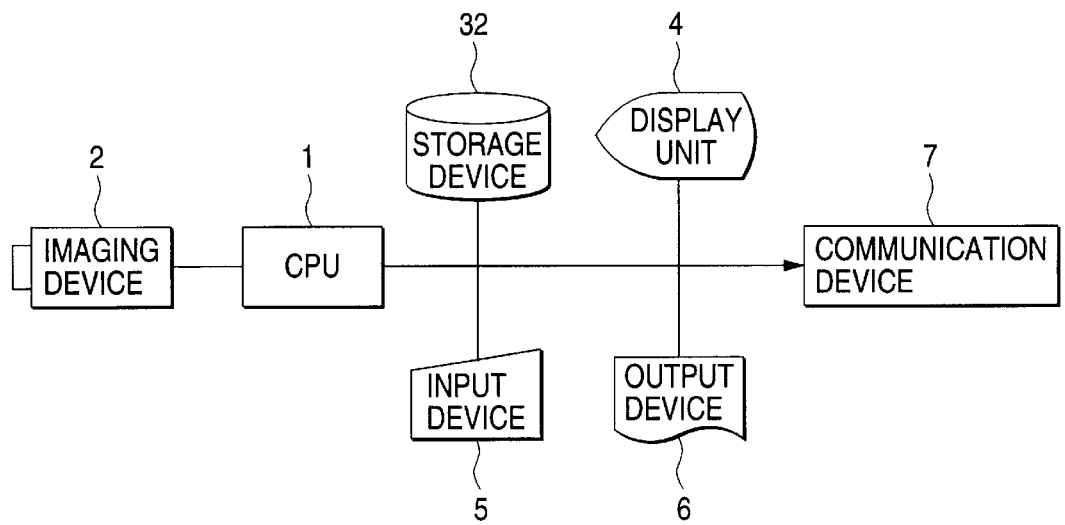
FIGS. 23A and 23B are schematic block diagrams showing an image processing apparatus according to a sixth embodiment of the present invention.
Figure 23B:
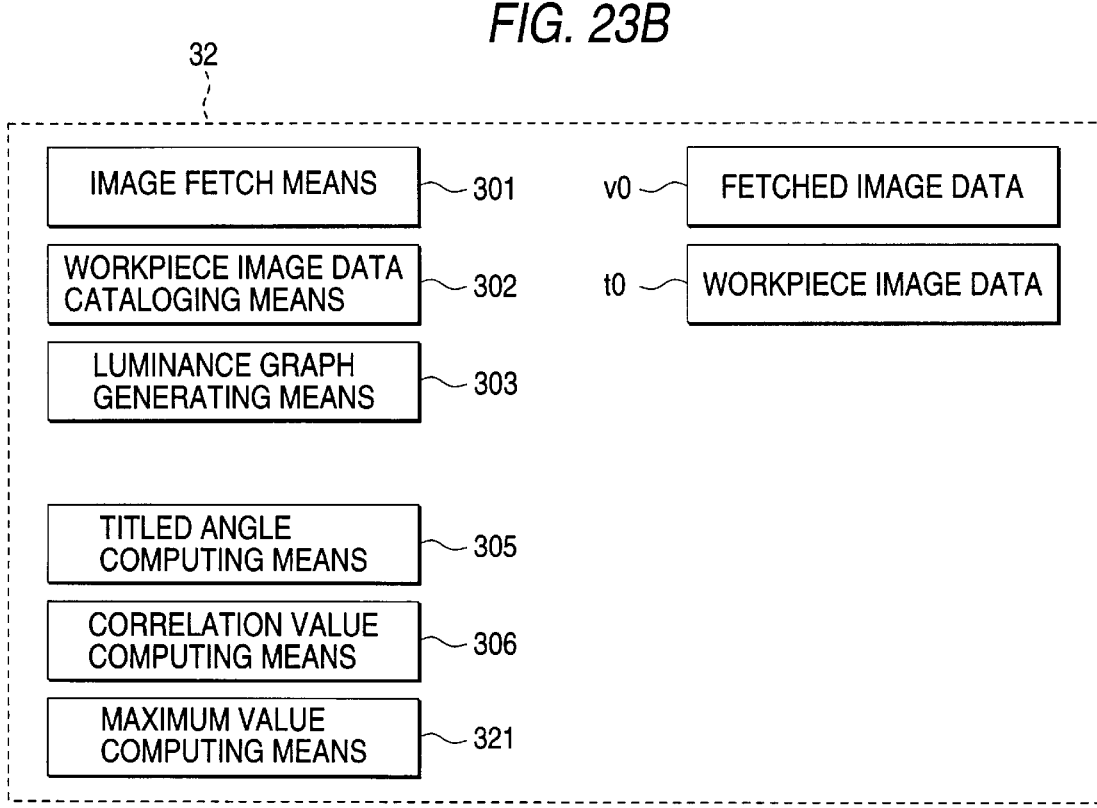
Figure 24:
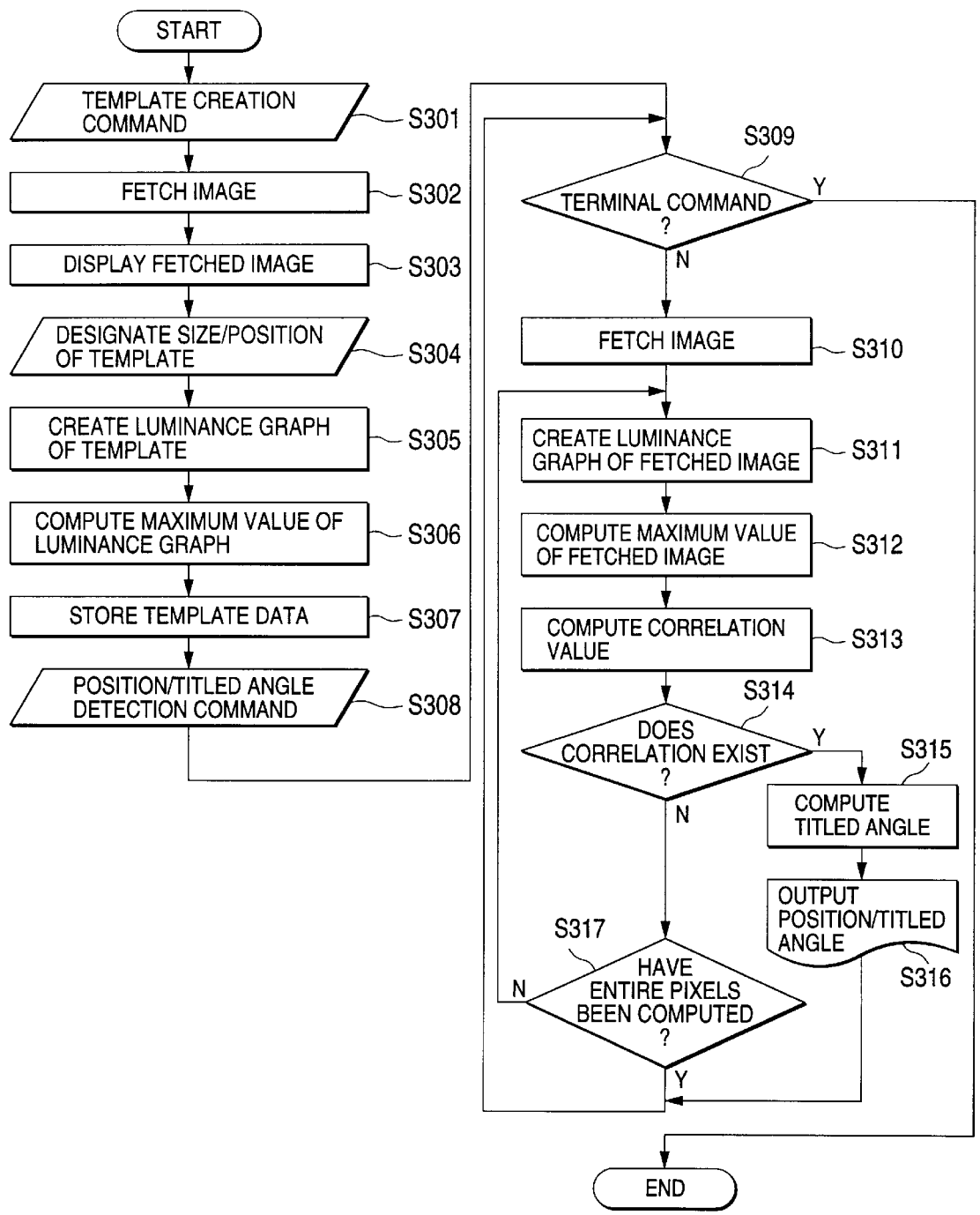
FIG. 24 is a flowchart showing the operation of the image processing apparatus according to the sixth embodiment of the invention.

Embodiment 6:

Referring to FIGS. 23A–25, there will be given a description of a sixth embodiment of the present invention. FIGS. 23A and 23B are schematic block diagrams illustrating an image processing apparatus according to this embodiment of the invention and this image processing apparatus is different from what is shown in FIGS. 1A and 1B in that a storage device 32 is equipped with a maximum value computing means 321 as a characteristic value computing means in place of the Fourier expansion means 304. In a flowchart of FIG. 24, the maximum value on the luminance graph in place of Fourier expansion therein is computed at Step S306.

Figure 25:
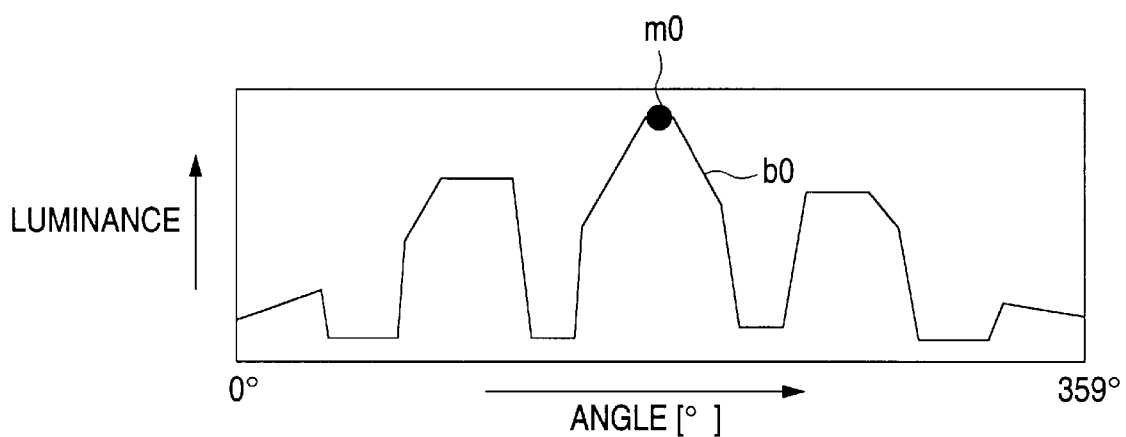
FIG. 25 is a diagram illustrating the computation of the maximum value position of luminance according to the sixth embodiment of the invention.

As shown in FIG. 25, a maximum value m0 on the luminance graph b0 is computed and when the graph g0 of FIG. 8 is generated, the angular positions m0 - mn of the maximum value instead of the angular positions p0 - pn thereof in Fourier expansion are employed (computation of maximum value on luminance graph). This computation is also made in a case where the maximum value of the fetched image is computed at Step S312.

Thus the advantage is that the use of the position where the luminance is maximized makes the time required to recognize the position and tilted angle of an object for detection shorter than what is required in the case of Fourier expansion.

Figure 26A:
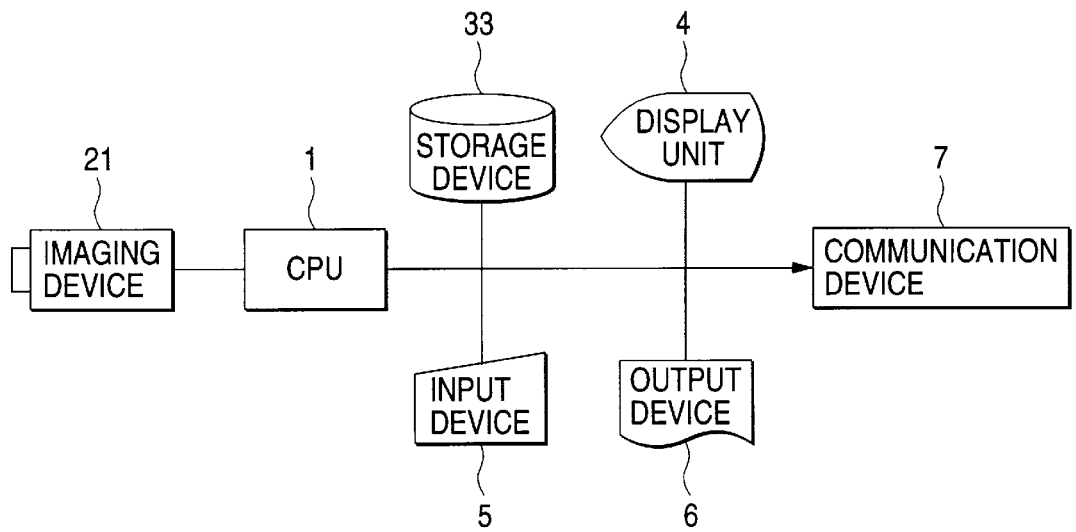
FIGS. 26A and 26B are schematic block diagrams showing an image processing apparatus according to a seventh embodiment of the present invention.
Figure 26B:
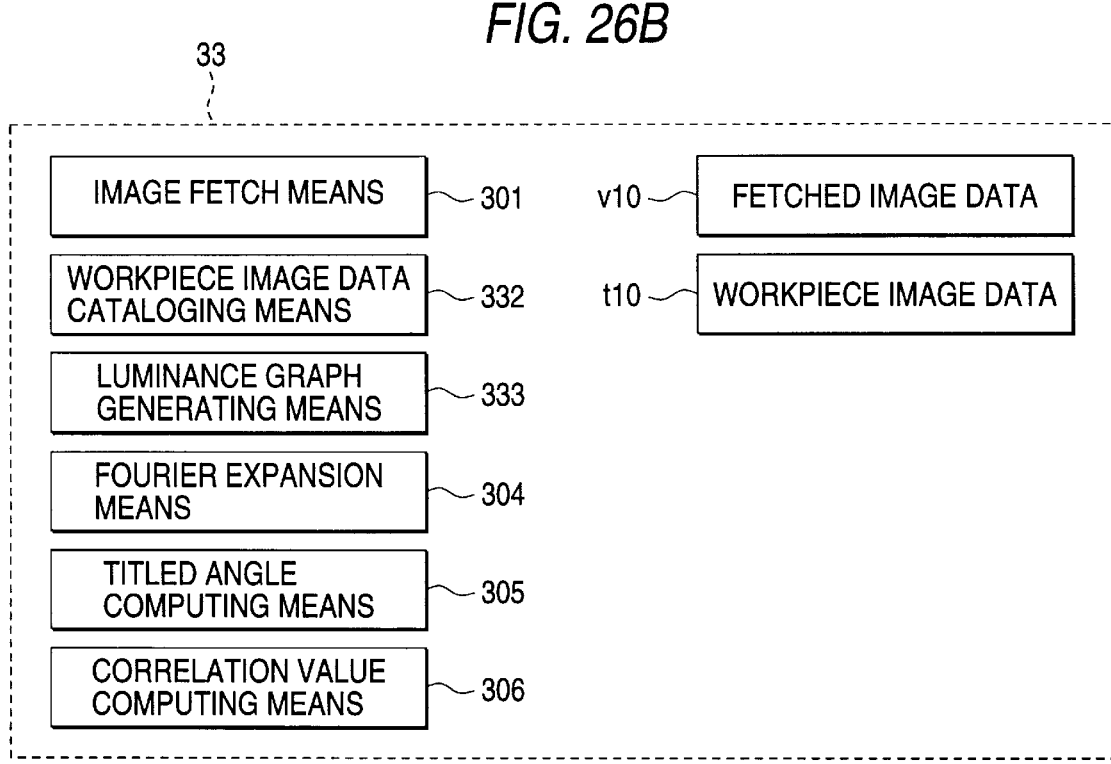
Figure 27:
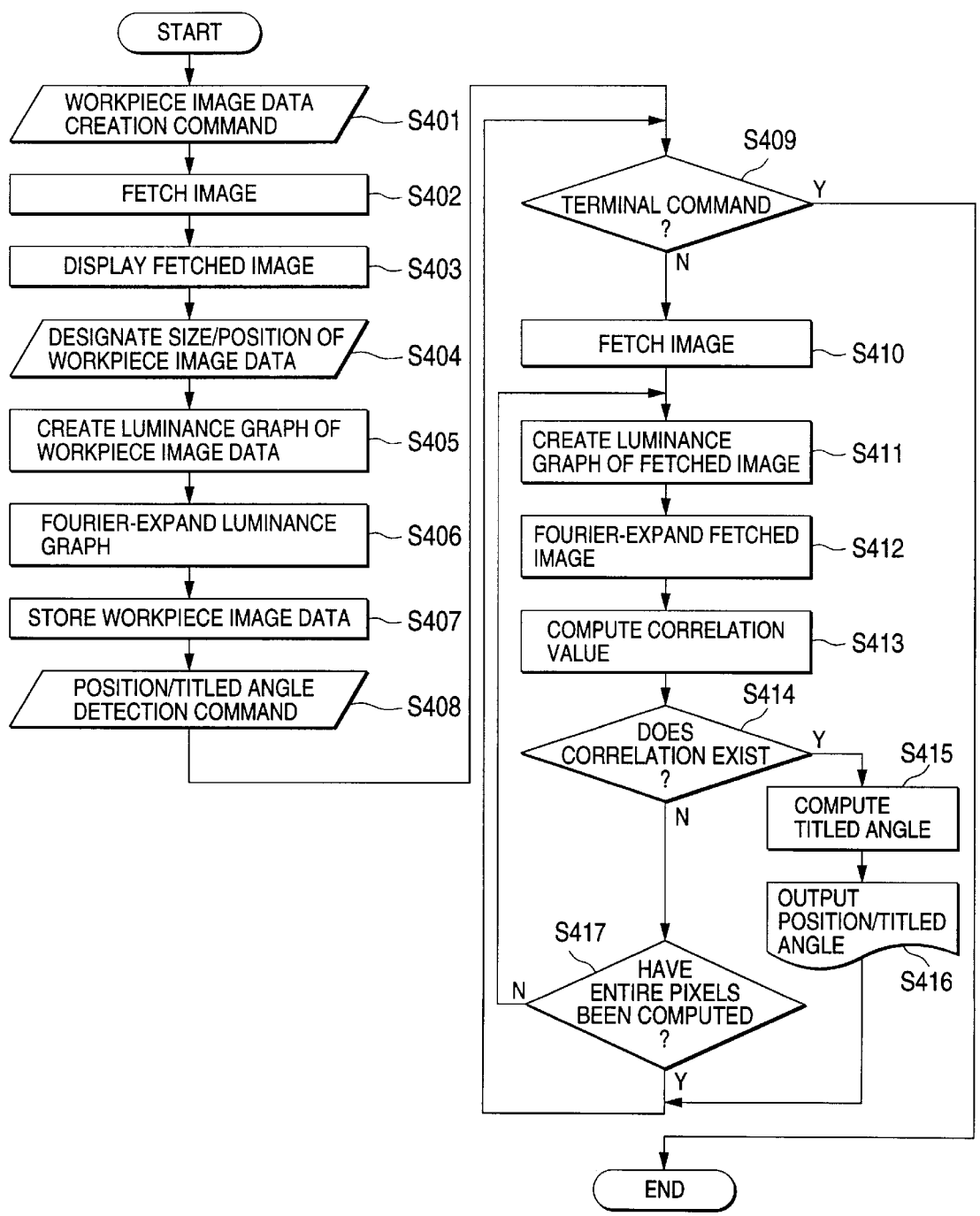
FIG. 27 is a flowchart showing the operation of the image processing apparatus according to the seventh embodiment of the invention.

Embodiment 7:

Referring to FIGS. 26A–40, there will be given a description of a seventh embodiment of the present invention. FIGS. 26A and 26B are schematic block diagrams illustrating an image processing apparatus according to this embodiment of the invention and this image processing apparatus is different from what is shown in FIGS. 1A and 1B in that it has a storage device 33 and an imaging device 21 instead. The operation of a workpiece image data cataloging means 332 and a workpiece image data cataloging means 332 in particular will be described by reference to a flowchart of FIG. 27. At Step S401, first, a workpiece image data command is input by the input device 5 of FIG. 26A (workpiece image data creation command).

Figure 28A:
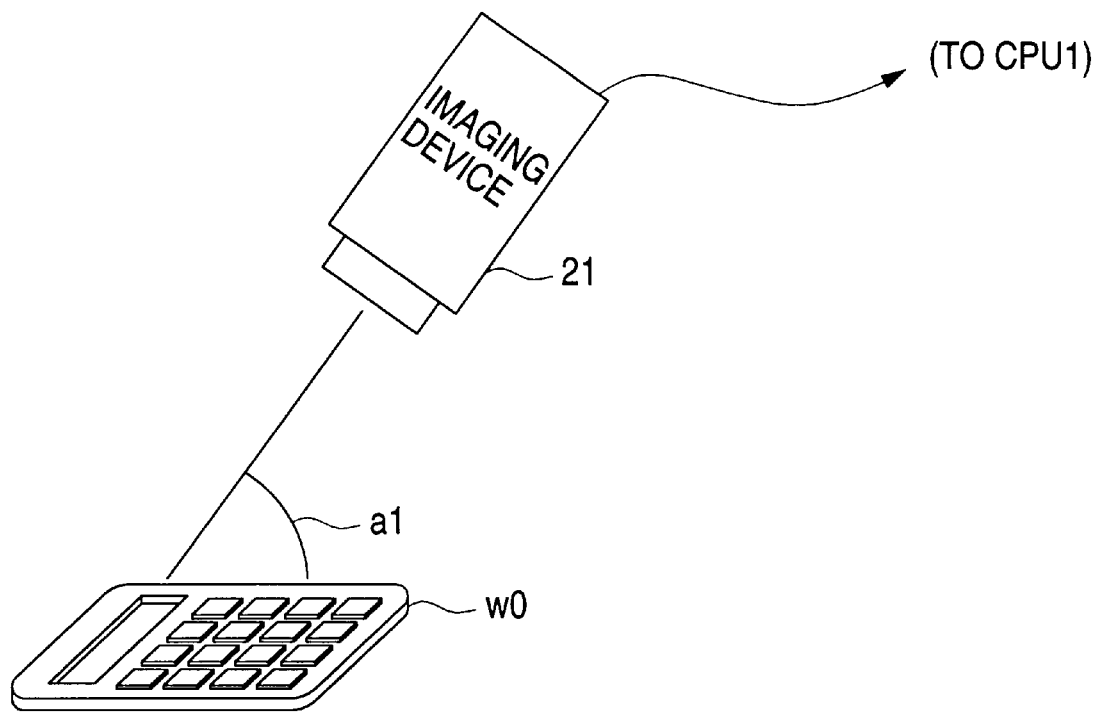
FIGS. 28A and 28B are diagrams illustrating workpiece imaging which provides a basis for tilted angle detection according to the seventh embodiment of the invention.

At Step S402 then, the CPU 1 starts the image fetch means 301 of the storage device 33 to fetch an image of the workpiece w0 shown in FIG. 28A from the imaging device 21 and stores the image as image data v10 in the storage device 3. In this case, the angle between the imaging device 21 and the workpiece w0 is assumed to be an angle a1 (fetching of image).

Figure 28B:
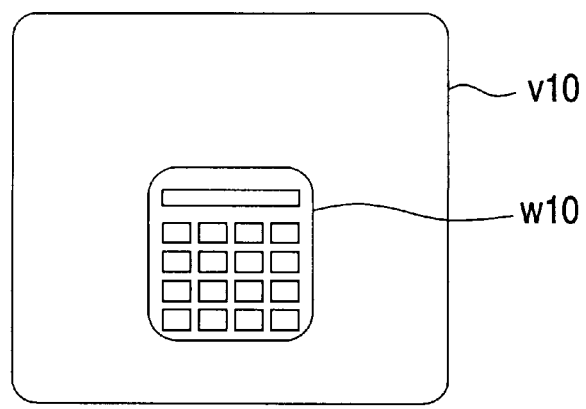

At Step S403, the CPU 1 displays on the display unit 4 the image data v10 shown in FIG. 28B. In this case, a workpiece w10 in the image data v10 is displayed what has vertically been compressed sin (a1) times greater than the actual workpiece w0 (display of fetched image).

At Step S404, further, the workpiece image data size-position setting command is input by the input device 5 to make the CPU 1 display on the display unit 4 an ellipse c1000 of a elliptic window frame of FIG. 29A showing the size-position of the workpiece image data. Then the CPU 1 designates the size-position data on the workpiece image data by inputting the long and short diameters of the ellipse, its central coordinate data and the like, so that the workpiece w10 stays within the ellipse c1000 as shown in FIG. 29A. Further, the CPU 1 extracts the portion encircled by the ellipse c1000 as the workpiece image data t10 of FIG. 29B from the image data v10. Workpiece image data T10 of FIG. 29C shows the data structure of the workpiece image data t10 such that the inside of the ellipse is arranged in a grid-spaced form on a pixel basis to provide such a data structure as to let each grid have luminance data on each pixel. Numerical values 1, 3, 5, . . . denote the luminance values of luminance of the workpiece image data (designation of size-position of workpiece image data).

Figure 30A:
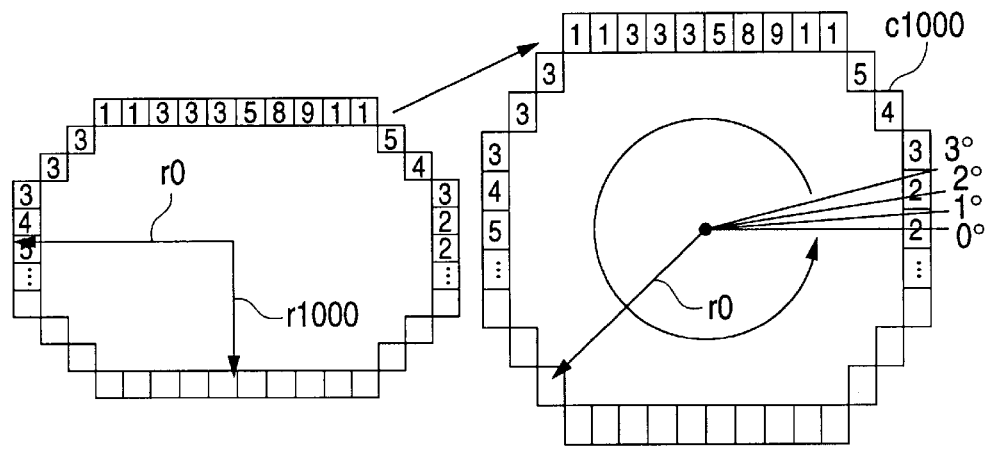
FIGS. 30A and 30B are diagrams illustrating a luminance graph of the workpiece image according to the seventh embodiment of the invention.
Figure 30B:
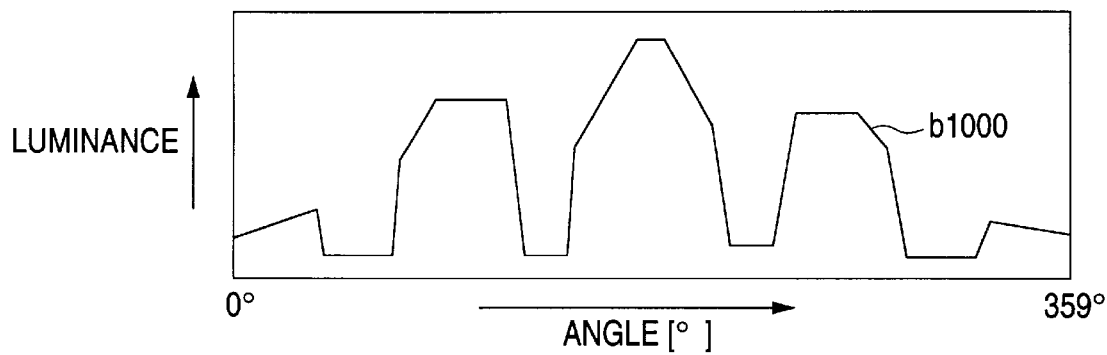

At Step S405, the CPU 1 converts the ellipse c1000 having long and short diameters r0, r1000 out of the luminance data on the workpiece image data t10 to a circle by vertically extending the former at a ratio of r0/r1000 as shown in FIG. 30A and then creates a luminance graph b1000 corresponding to 0 to 359° as shown in FIG. 30B. In other words, it is possible to apply the method by means of the circular workpiece image shown in Embodiment 1 to the elliptical workpiece image by extending the ellipse c1000 into a circle (generation of luminance graph of workpiece image data).

Figure 31:
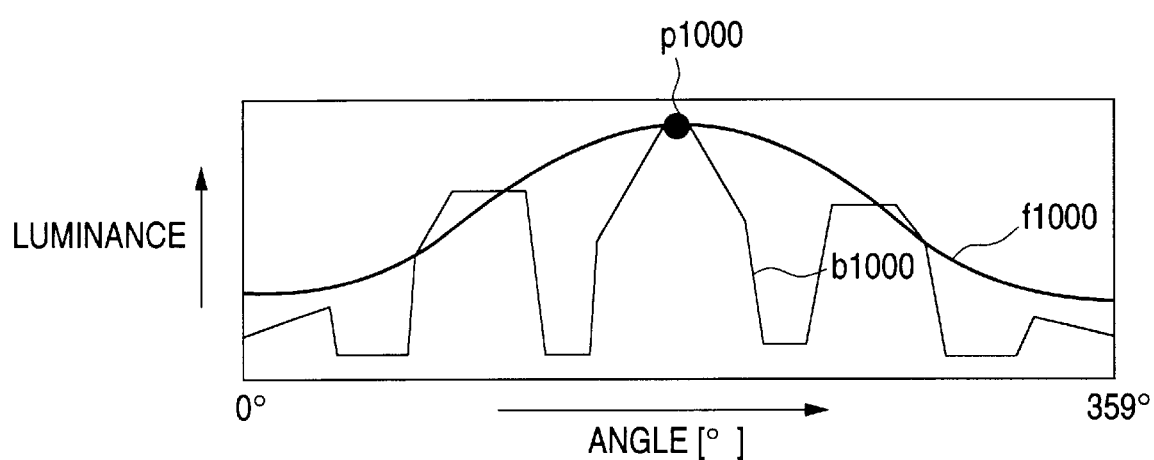
FIG. 31 is a graph illustrating the initial term of Fourier expansion of the workpiece image according to the seventh embodiment of the invention.

At Step S406, further, the CPU 1 obtains an angle p1000 at which the luminance graph b1000 takes the maximum value as shown in FIG. 31 and stores the angle in the storage device 33. In this case, the angle p1000 at which the luminance graph b1000 takes the maximum value is obtained as an angle at which the initial term f1000 of Fourier expansion takes the maximum value when the value of Eq. (15) is 0 and also when that of Eq. (16) is negative in Eq. (15) resulting from differentiating Eq. (14) of the initial term f1000 of Fourier expansion once and Eq. (16) resulting from differentiating Eq. (14) thereof twice in terms of the angle θ.

$$f1000(\theta) = D - E \times \cos\theta - F \times \sin\theta \qquad (14)$$

$$d(f1000(\theta)/d\theta) = E \times \sin\theta - F \times \cos\theta \qquad (15)$$

$$d(d(f1000(\theta)/d\theta) = E \times \cos\theta + F \times \sin\theta \qquad (16)$$

In this case, the coefficients D, E, F in Eqs. (14)–(16) are computed with the following Eqs. (17)–(19). A constant π in Eqs. (18)–(19) is a circle ratio (3.1415926 . . . ); the sin in Eqs. (14)–(19) a sine function; and the cos therein a cosine function. The symbol d in Eqs. (15) and (16) represents differentiation.

[Numerical Formula 10] (17)

$$D = (1/360) \times \sum_{i=0}^{359} (b1000(i))$$

[Numerical Formula 11] (18)

$$E = (1/180) \times \sum_{i=0}^{359} \{b1000(i) \times \cos(\pi \times i/180)\}$$

-continued

[Numerical Formula 12] (19)

$$F = (1/180) \times \sum_{i=0}^{359} \{b1000(i) \times \sin(\pi \times i/180)\}$$

Figure 32A:
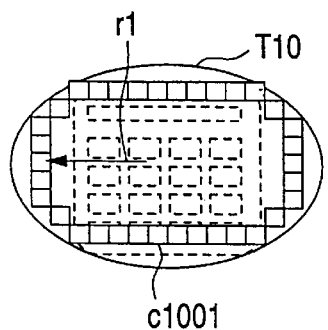
FIGS. 32A–32F are graphs illustrating the initial term of Fourier expansion of the workpiece image according to the seventh embodiment of the invention.
Figure 32B:
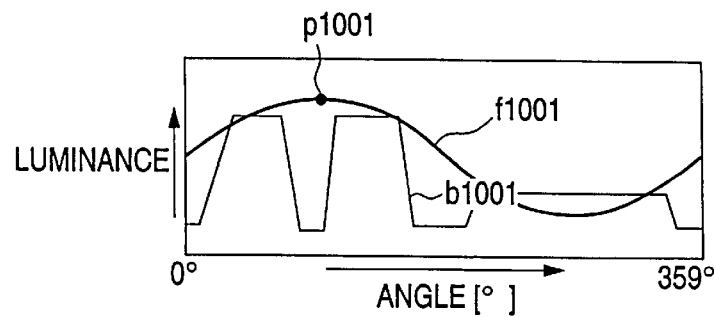
Figure 32C:
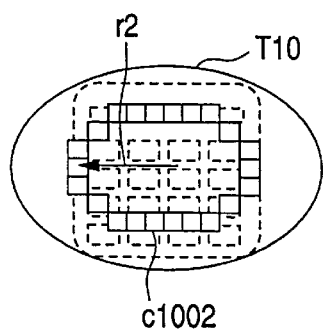
Figure 32D:
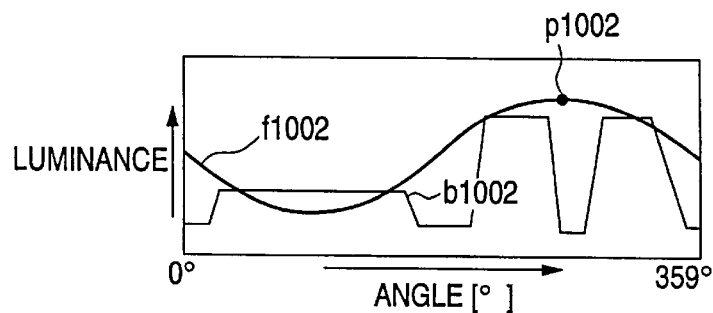
Figure 32E:
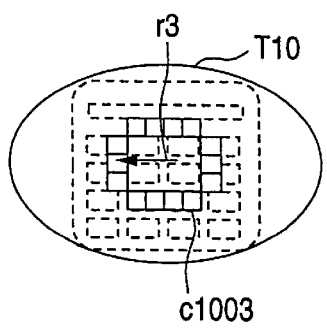
Figure 32F:
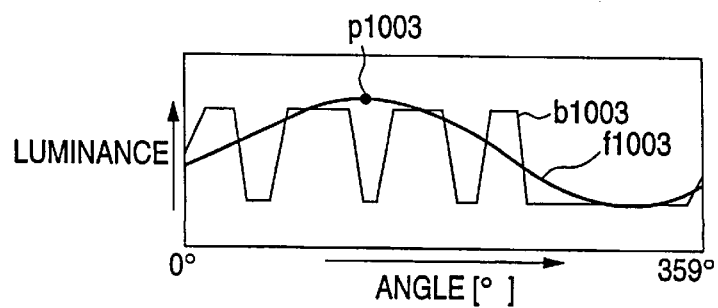

With respect to an ellipse c1001 which is similar to the ellipse c1000 and whose long diameter r1 is smaller by one pixel than the long diameter r0 of the ellipse c1000 as shown in FIG. 32A, further, an angle p1001 is computed as in the ellipse c1000 of FIG. 31, at which angle the initial term f1001 of Fourier expansion of luminance b1001 on the ellipse c1001 takes the maximum value because of the Fourier expansion. Further, angles p1002, p1003 are successively computed with respect to ellipses p1002, p1003 whose long diameters are respectively smaller by one pixel than that of the ellipse c1000 likewise as shown in FIGS. 32D and 32F. The maximum value of the initial term of Fourier expansion of luminance with respect to each long diameter is computed by decreasing the long diameter of the window from r0 pixel by pixel, whereby a graph g1000 of angles computed from n of converted concentric angles generated by the central angular position pattern computing means as shown in FIG. 33 is stored in the storage device 33. The number n of similar ellipses should be set what is smaller by one than the value obtained by dividing the long diameter r0 of the ellipse c1000 by the dimension of one pixel (Fourier expansion of luminance graph).

At Step S407, the CPU 1 stores a graph g1000 of angles, long diameters r0 and short diameters r1000 as workpiece image data in the storage device 3 (cataloging of workpiece image data).

At Step S408, further, a position-tilted angle detection command and the threshold value s0 of the correlation value s between workpiece image data t1000 and the fetched image data are input by the input device 5 of FIG. 26A. The threshold value s0 is set so that only a greater correlation value is detected: for example, 90% of the maximum value of the correlation value s that can be taken (position-tilted angle detection command).

Steps from Step S409 up to Step S417 thereafter are to be repeated, whereupon a termination command is input by the input device 5 when processing interruption is needed (termination command is given).

Figure 34A:
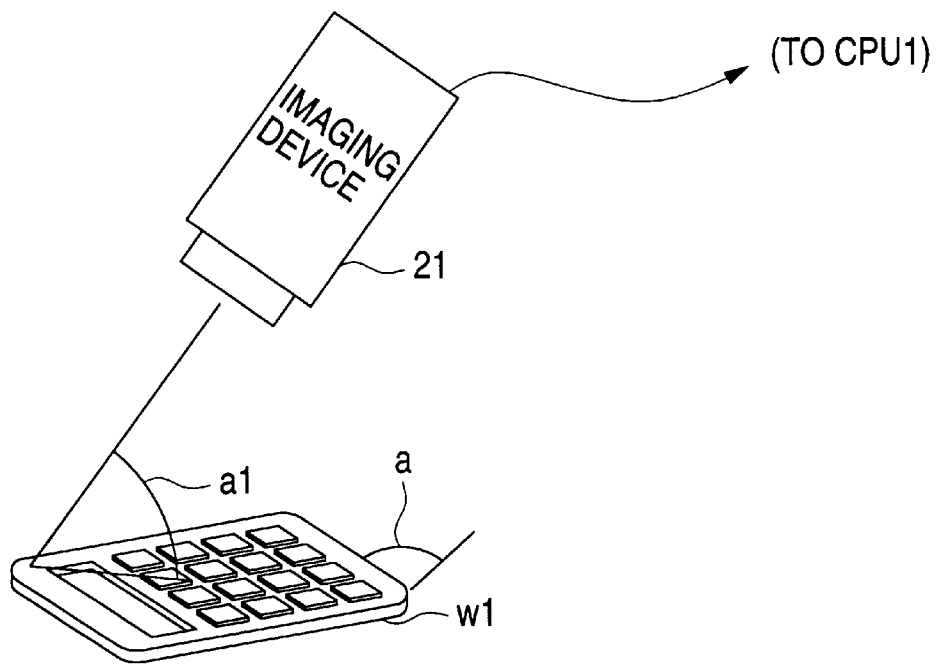
FIGS. 34A and 34B are diagrams illustrating the picking-up of a fetched image of an object for detection which is tilted from a reference line according to the first embodiment of the invention.
Figure 34B:
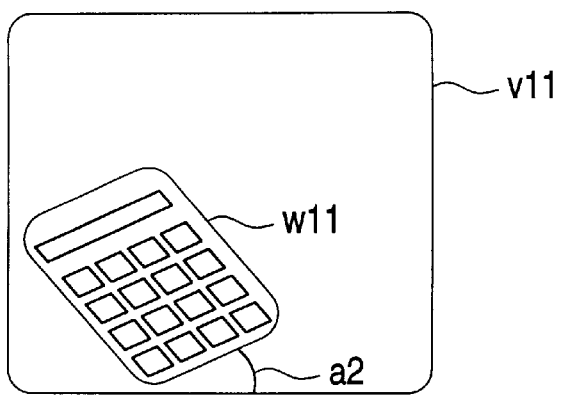

At Step S410, the CPU 1 starts the image fetch means 301 of the storage device 33 similarly as shown at Step S402, fetches the image of the workpiece w1 shown in FIG. 34A from the imaging device 2 and stores the workpiece image as the fetched image data v11 in the storage device 33. As shown in FIG. 34B, the workpiece w1 is assumed as what is tilted by an angle of a with respect to the workpiece w0 of FIG. 28A. The imaging device 21 forms an angle of a1 with the workpiece w1 (fetching of image).

Figure 35A:
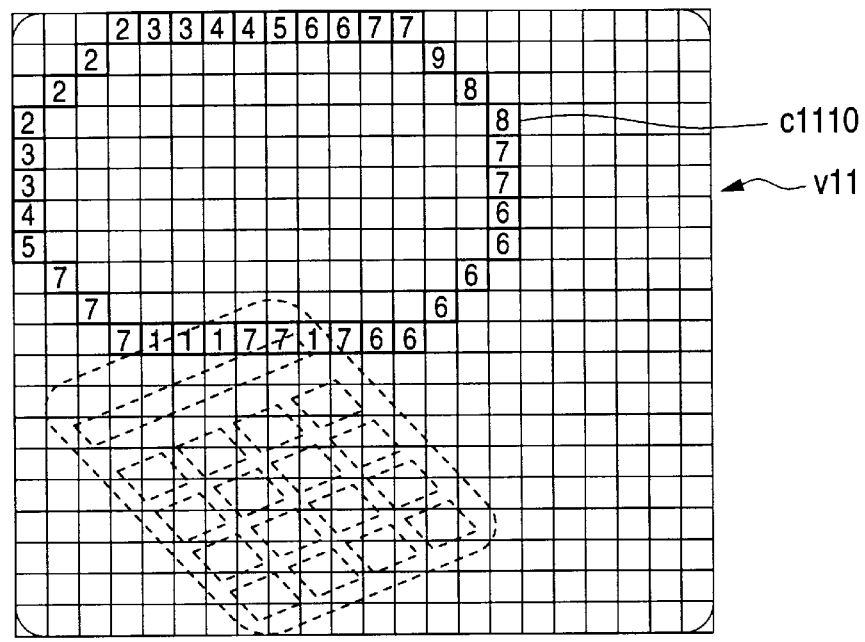
FIGS. 35A and 35B are diagrams illustrating the generation of the central angular position pattern of the object for detection which is tilted from the reference line according to the seventh embodiment of the invention.

At Step S411, the CPU 1 converts an ellipse c1110 having long and short diameters r0, r1000 out of the fetched image data v11 shown in FIG. 35A to a circle similarly as shown at Step S405 and creates a luminance graph from the luminance data on the pixel. Similarly as shown at Step S405 and Step S406, further, a luminance graph is created also with respect to an ellipse having a long diameter shorter than r0 (creation of luminance graph of fetched images).

Figure 35B:
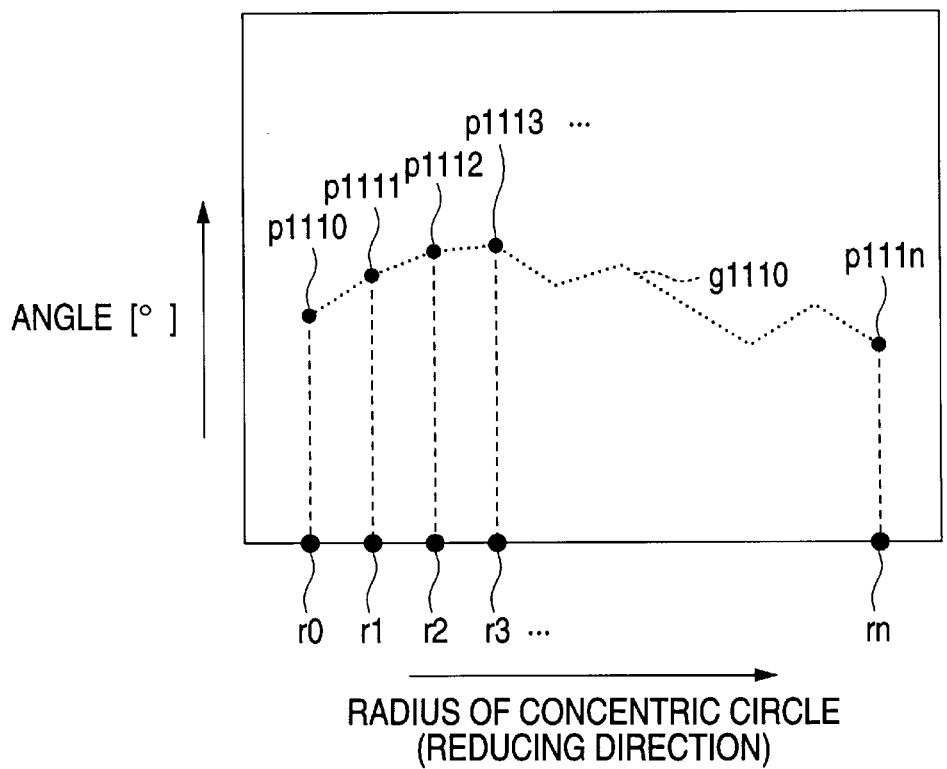

At Step S412, the CPU 1 creates a graph g1110 of angles of the image data v11 fetched by the central angular position pattern computing means as shown in FIG. 35B like the graph g1000 of angles of the workpiece image data t1000 obtained at Step S406 (Fourier expansion of fetched image).

At Step S413, the CPU 1 computes the correlation value s between the workpiece image data t10 and the fetched image data v11 using the following equation (20) by reference to not only the graph g1000 of angles of the workpiece image data v10 shown in FIGS. 28A and 28B but also the graph g1110 of angles of the fetched image data v11 stored in the storage device 33.

[Numerical Formula 13] (20)

$$s = \sqrt{\left\{\sum_{i=0}^{n-1} \sin(p100i - p111i)\right\}^2 + \left\{\sum_{i=0}^{n-1} \cos(p100i - p111i)\right\}^2} \Big/ n$$

Where the symbol p100 represents an angle on the graph g1000 of angles of the workpiece image data v10; and p111, an angle on the graph g1110 of angles of the fetched image data v11. Further, the symbol n represents the number of similar ellipses c1000, c1001, . . . ; n, a value smaller by 1 than the value resulting from dividing the long diameter r0 of the ellipse c1000 by the pixel dimension as shown at Step S406 (correlation value computation).

Figure 36:
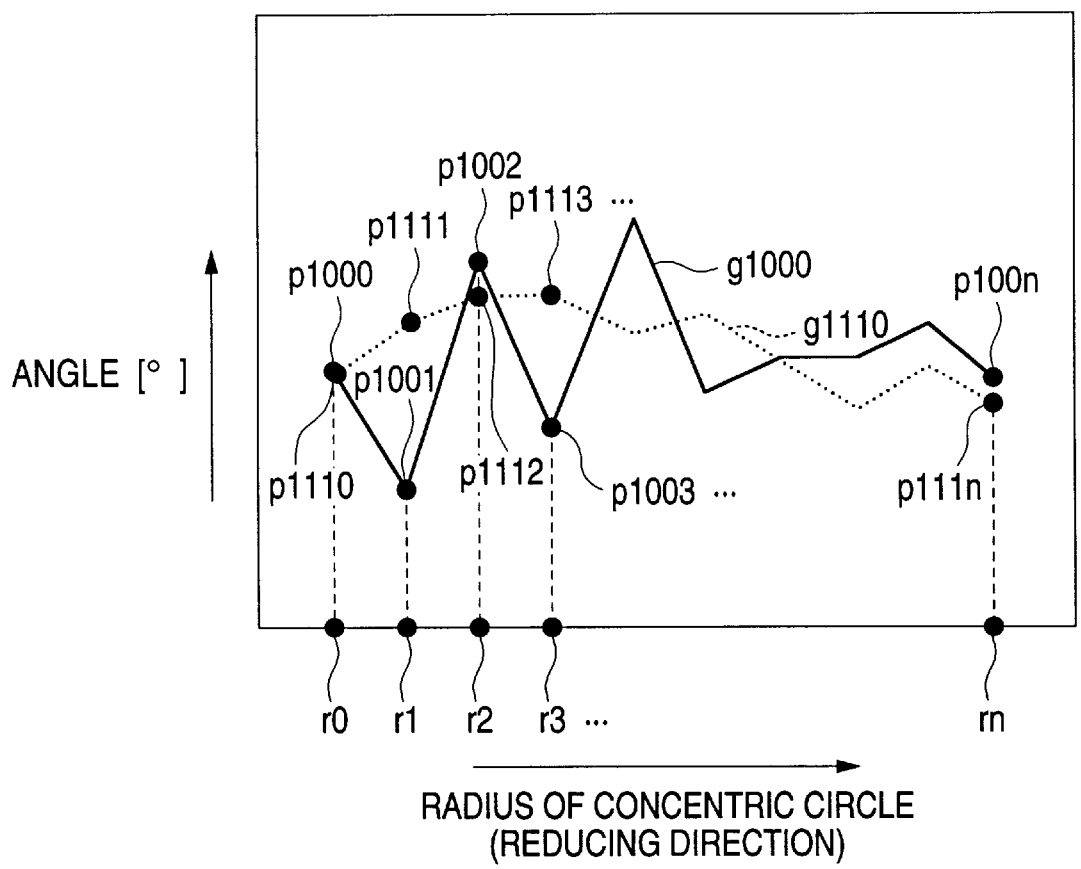
FIG. 36 is a graph illustrating the computation of correlated values between the workpiece image and the central angular position pattern of the fetched image according to the seventh embodiment of the invention.

At Step S414, the CPU 1 decides that when the correlation value s is greater than the threshold value s0, the workpiece image data v10 correlates with the fetched image data v11. The graph g1000 and the graph g1110 differ in form as shown in FIG. 36, which refers to a case where no correlation exists between them as the correlation value s becomes smaller than the correlation value s0 (correlation exists).

At Step S415, the CPU 1 computes a tilted angle a from the following equation (21) when the correlation is judged existent at Step S414 (tilted angle computation). In this case, $\tan^{-1}$ is an inverse tangent function.

[Numerical Formula 14] (21)

$$a = \tan^{-1}\left[\sum_{i=0}^{n-1} \sin(p100i - p111i) \Big/ \sum_{i=0}^{n-1} \cos(p100i - p111i)\right]$$

Figure 39A:
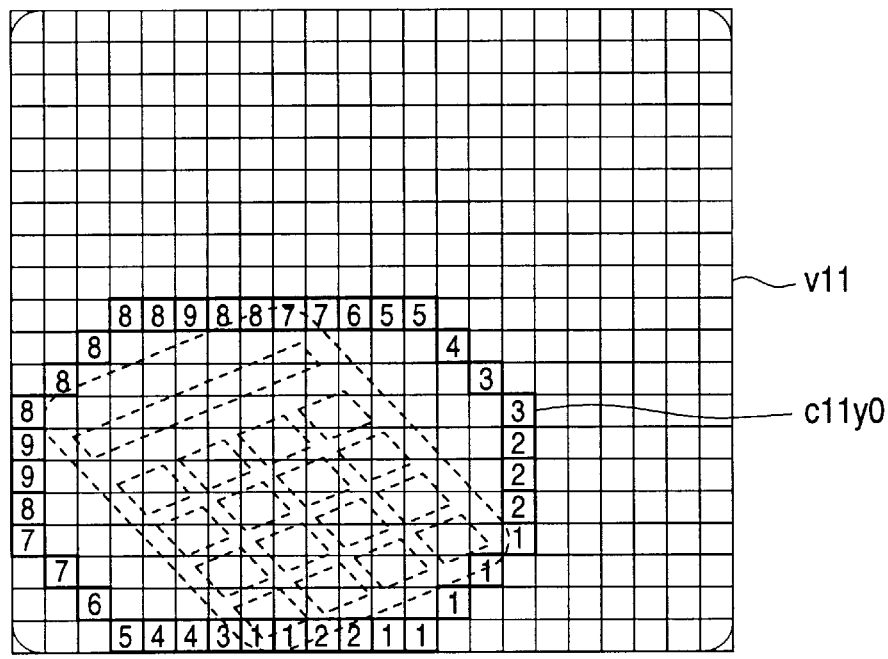
FIGS. 39A and 39B are diagrams illustrating a case where the position and tilted angle of the workpiece have been detected according to the seventh embodiment of the invention.
Figure 39B:
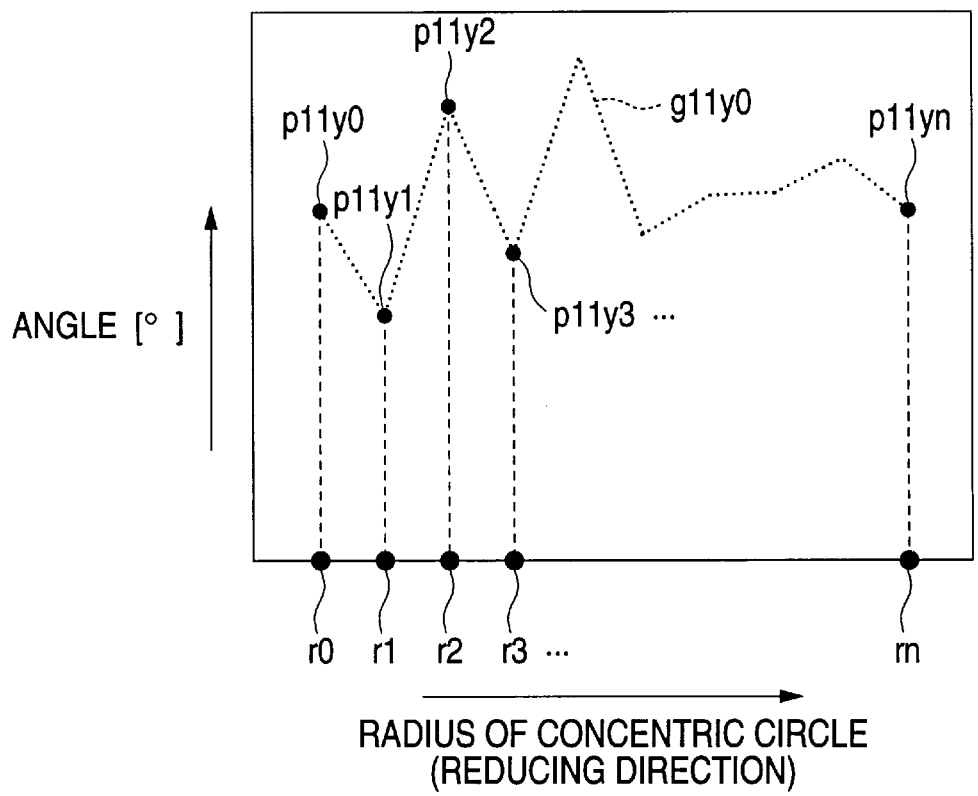
Figure 40:
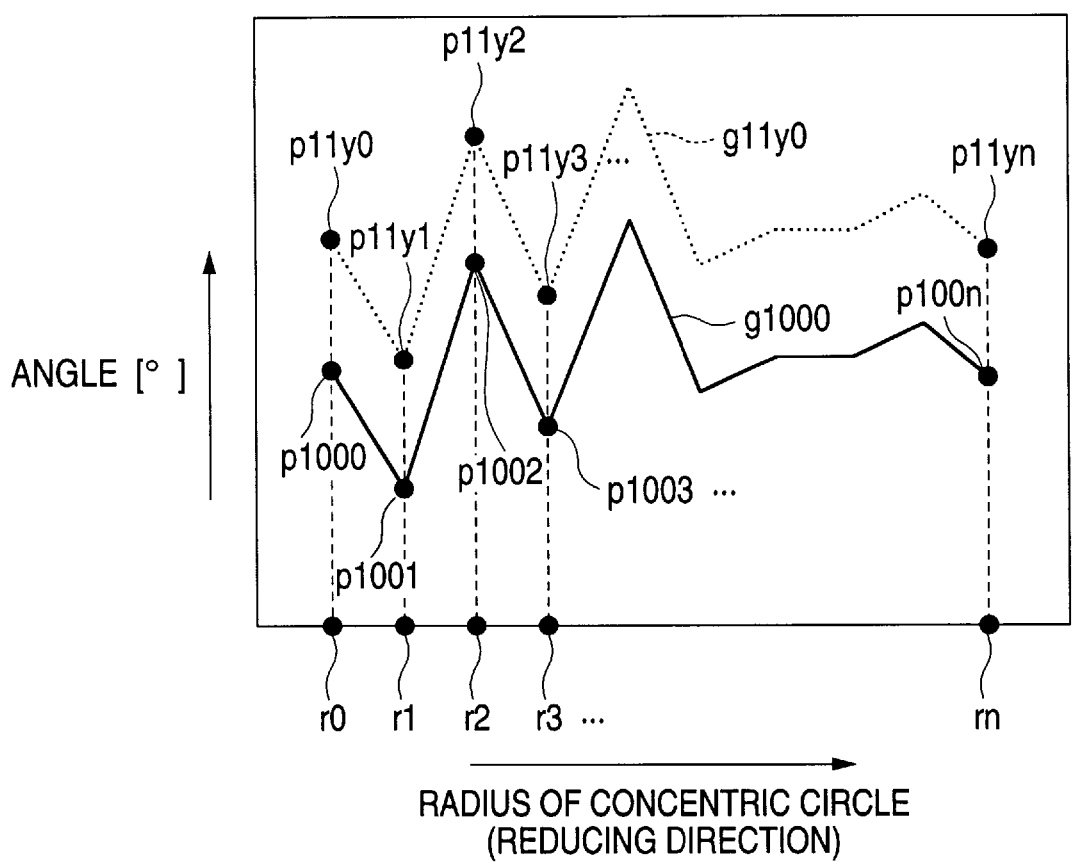
FIG. 40 is a diagram illustrating the central angular position pattern in a case where the position and tilted angle of the workpiece have been detected according to the seventh embodiment of the invention.
Figure 41A:
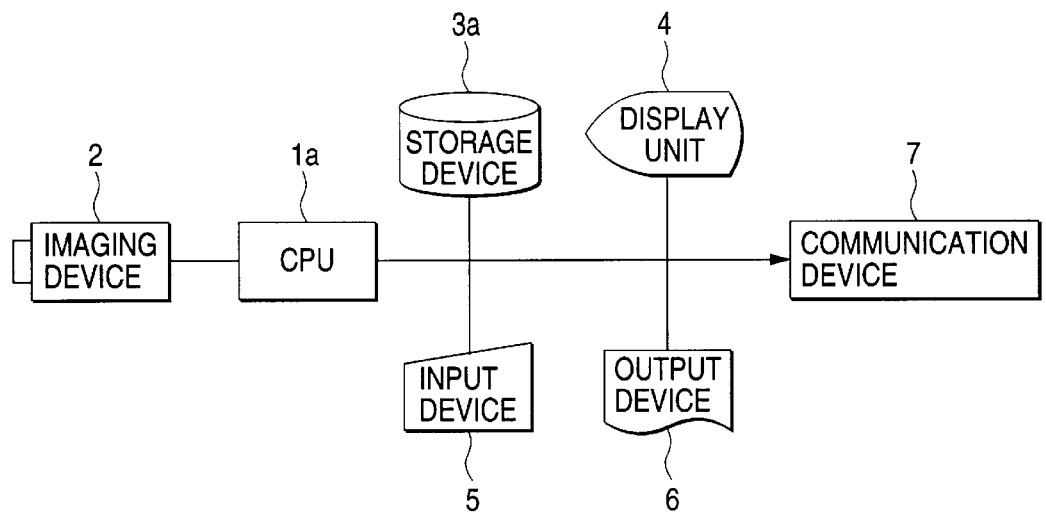
FIGS. 41A and 41B are schematic block diagrams showing a conventional image processing apparatus.
Figure 41B:
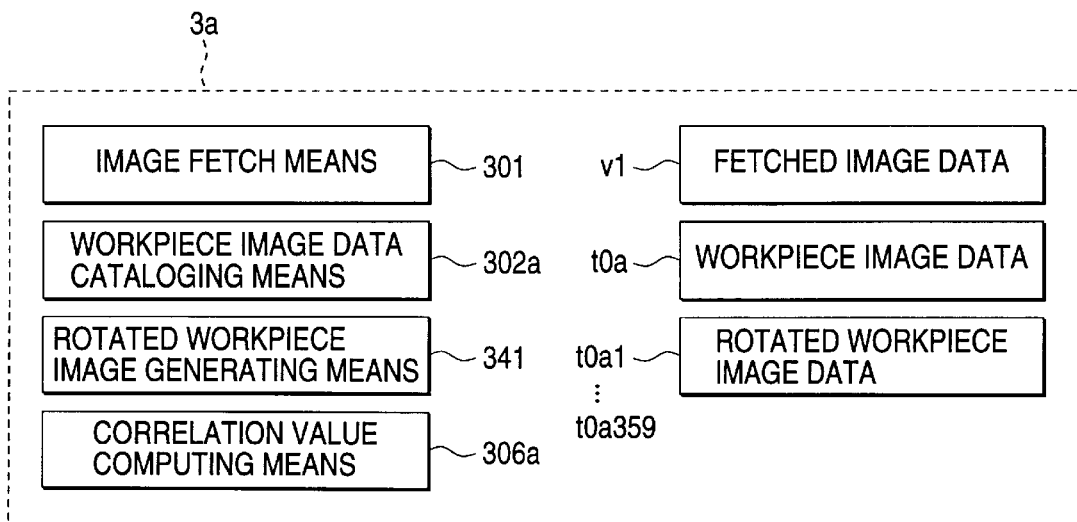
Figure 42:
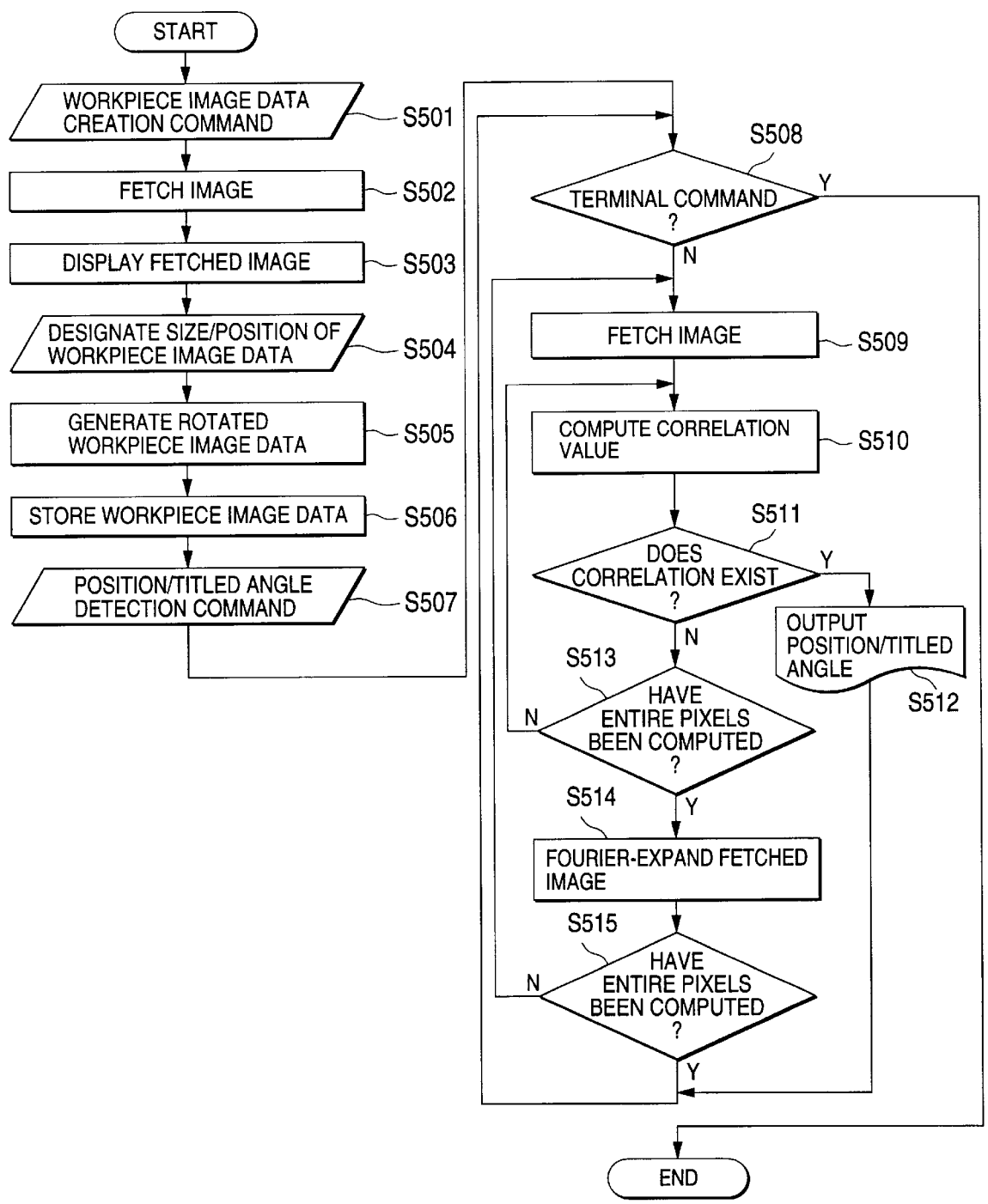
FIG. 42 is a flowchart showing the operation of the conventional image processing apparatus.
Figure 44A:
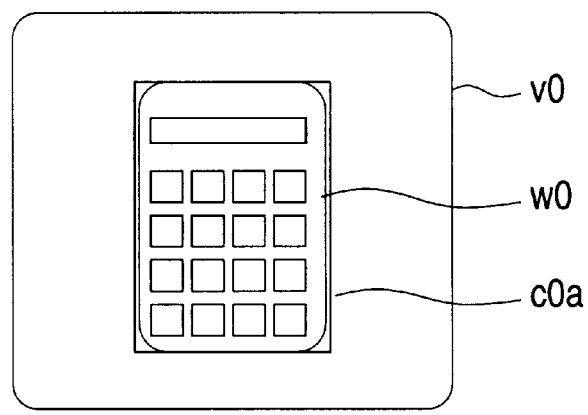
FIGS. 44A and 44B are diagrams illustrating data structure of a workpiece image by means of the conventional image processing apparatus.
Figure 44B:
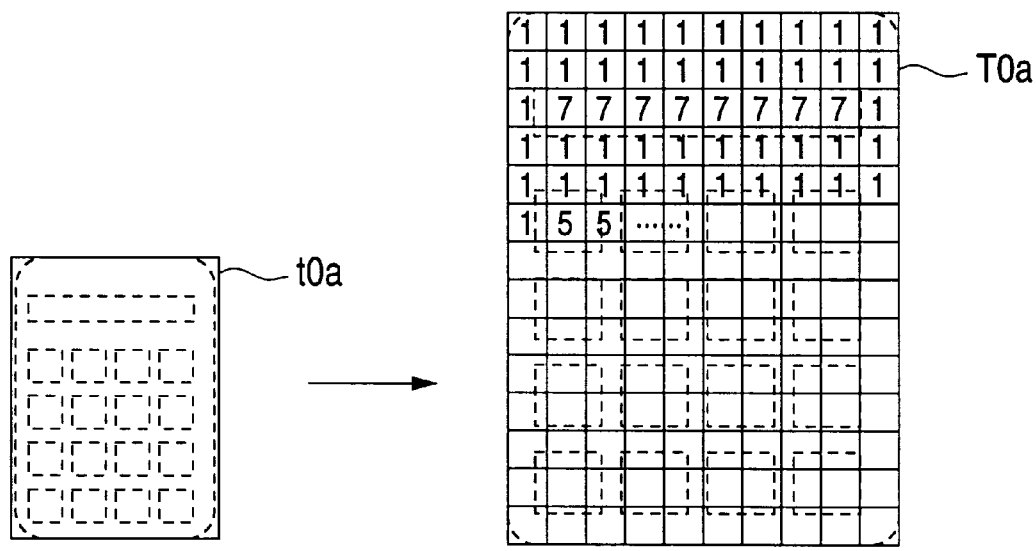
Figure 45A:
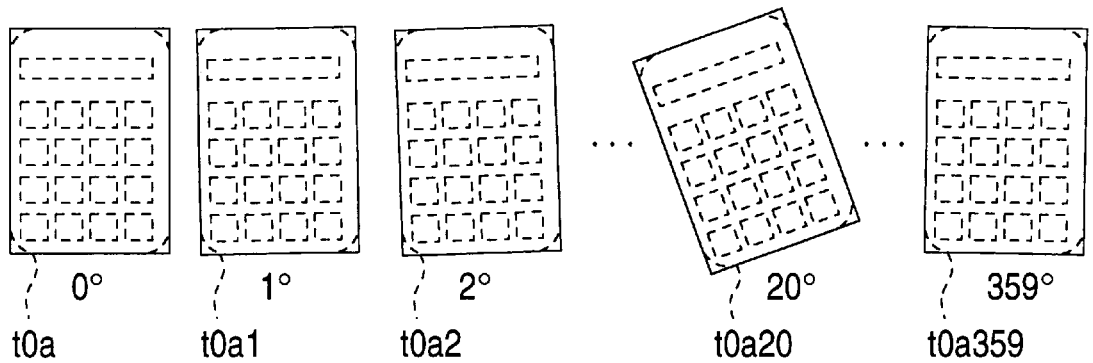
FIGS. 45A and 45B are diagrams illustrating a rotated workpiece image by means of the conventional image processing apparatus.
Figure 45B:
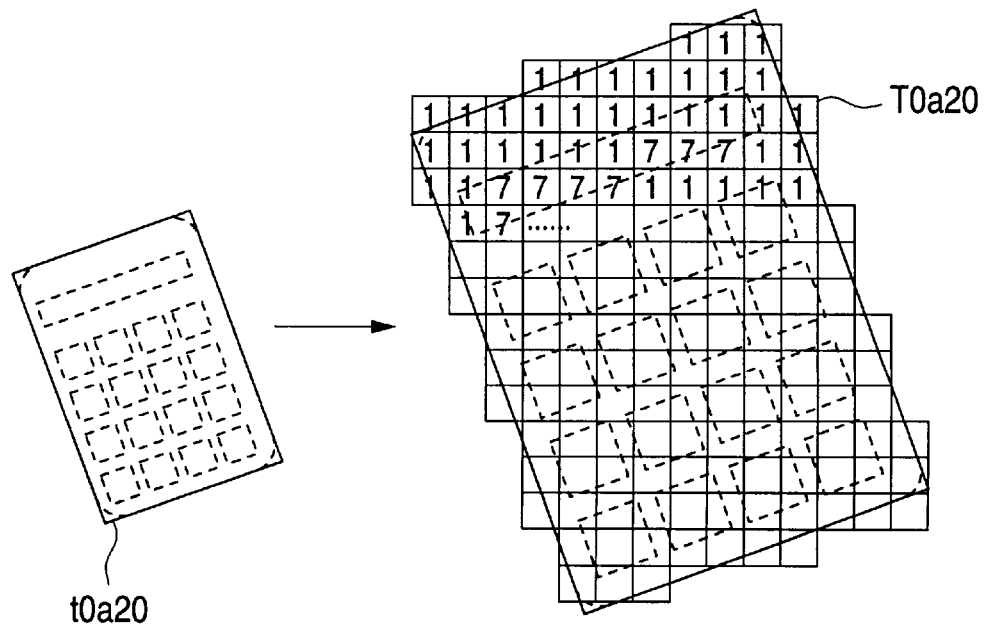
Figure 46A:
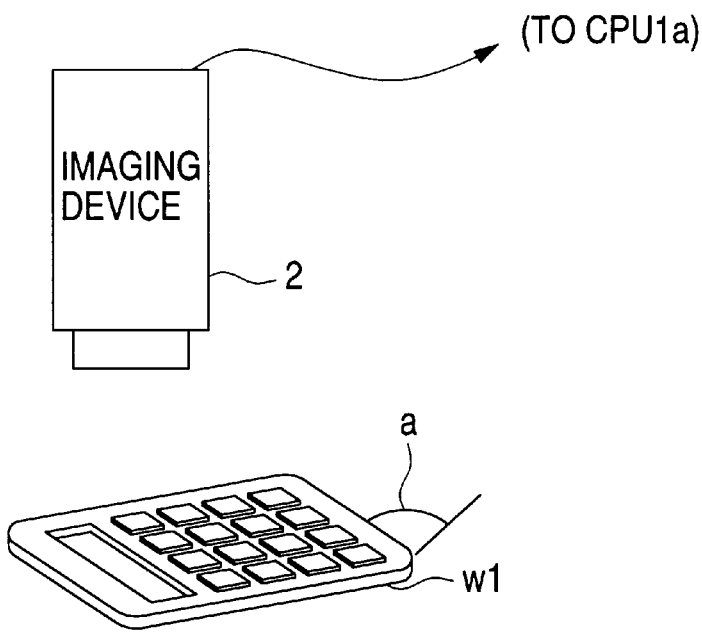
FIGS. 46A and 46B are diagrams illustrating the picking-up of a fetched image of an object for detection which is tilted from a reference line by means of the conventional image processing apparatus.
Figure 46B:
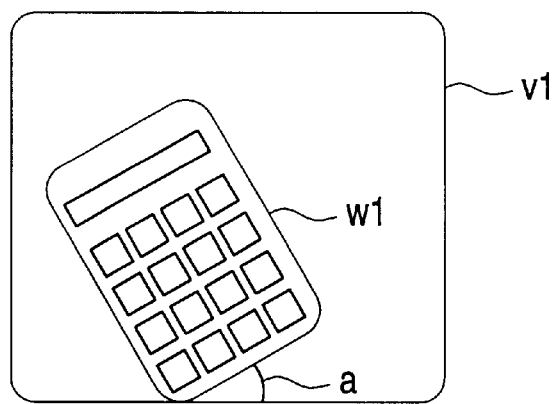
Figure 47A:
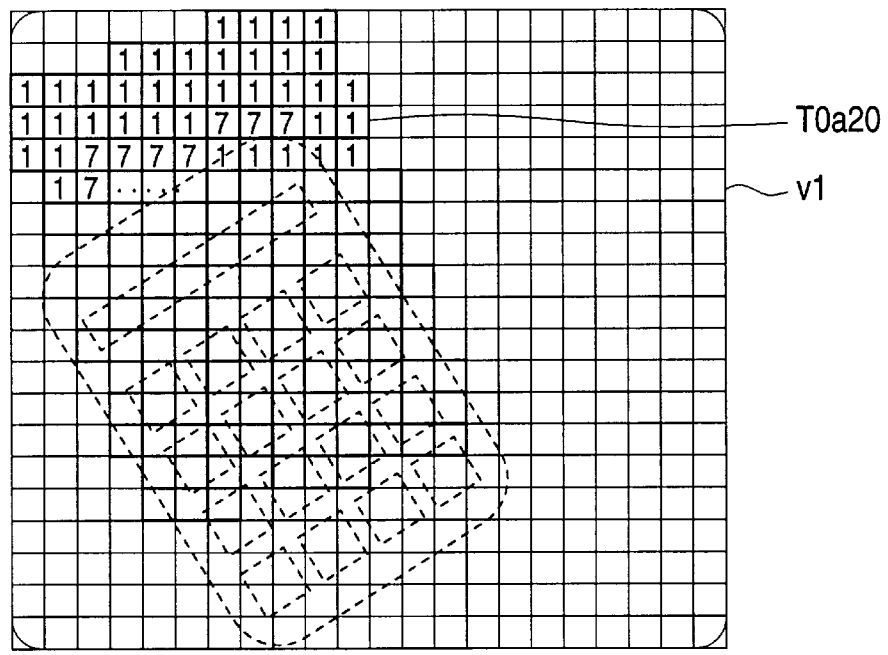
FIGS. 47A and 47B are diagrams illustrating the detection of the position and tilted angle of a workpiece by means of the conventional image processing apparatus.
Figure 47B:
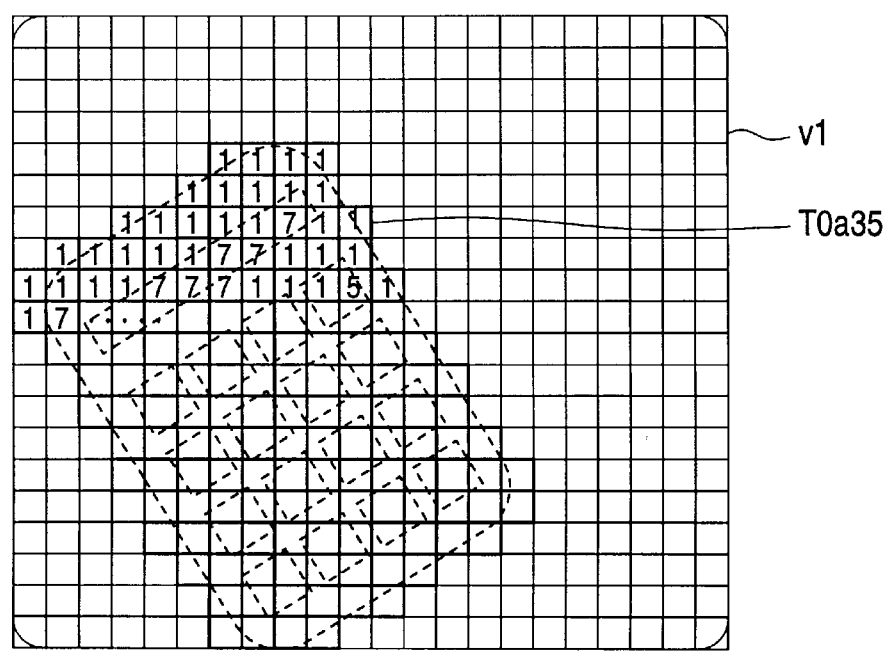

At Step S416, further, the CPU 1 types the position and tilted angle a or feeds them into the communication device 7 and returns to Step S409 when the correlation is judged existent at Step S414. FIG. 39A shows a ellipse c11y0 on the fetched image in the presence of the correlation; FIG. 39B, a graph g11y0 of angles; and FIG. 40 correlation value computation. The graph g1000 of angles of the workpiece image and the graph g11y0 of angles of the fetched image are similar in form to each other and formable by displacing one of them to the other in parallel, the quantity of that parallel displacement conforming to the angle a desired. As shown at Step S409, the CPU 1 terminates the processing when the termination command is given (outputting of position·tilted angle).

Figure 37A:
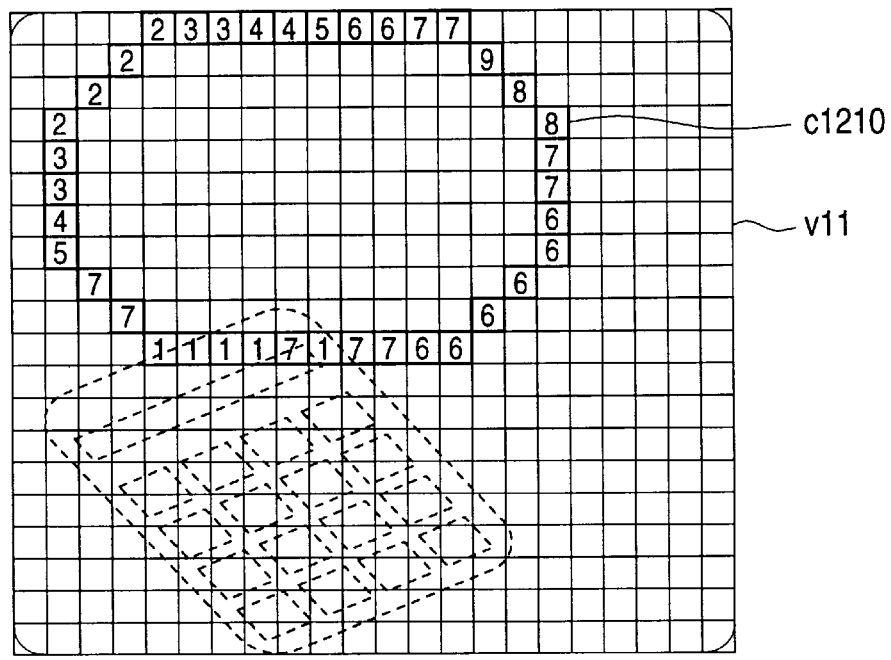
FIGS. 37A and 37B are diagrams illustrating the order of computing the correlated values according to the seventh embodiment of the invention.
Figure 37B:
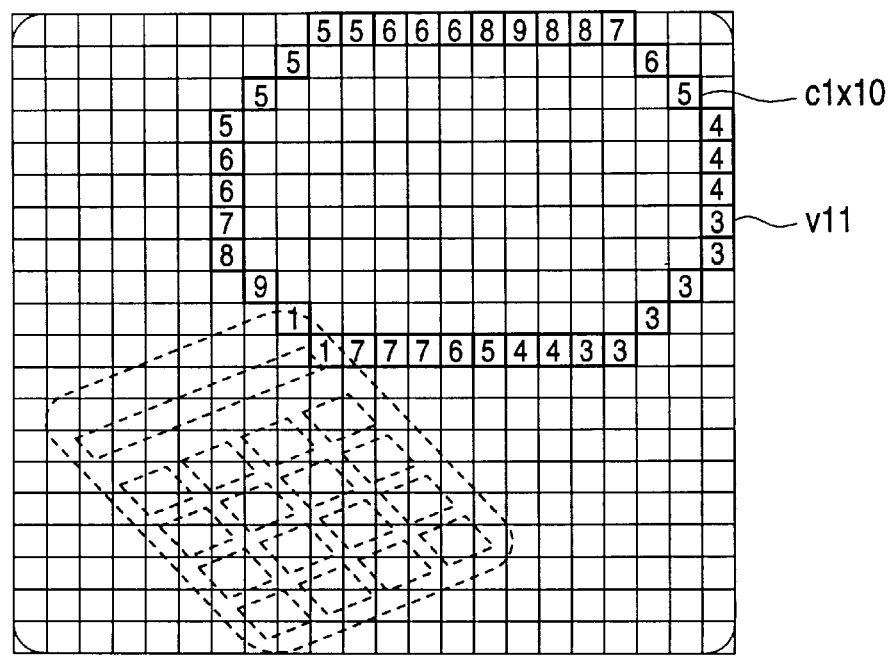
Figure 38A:
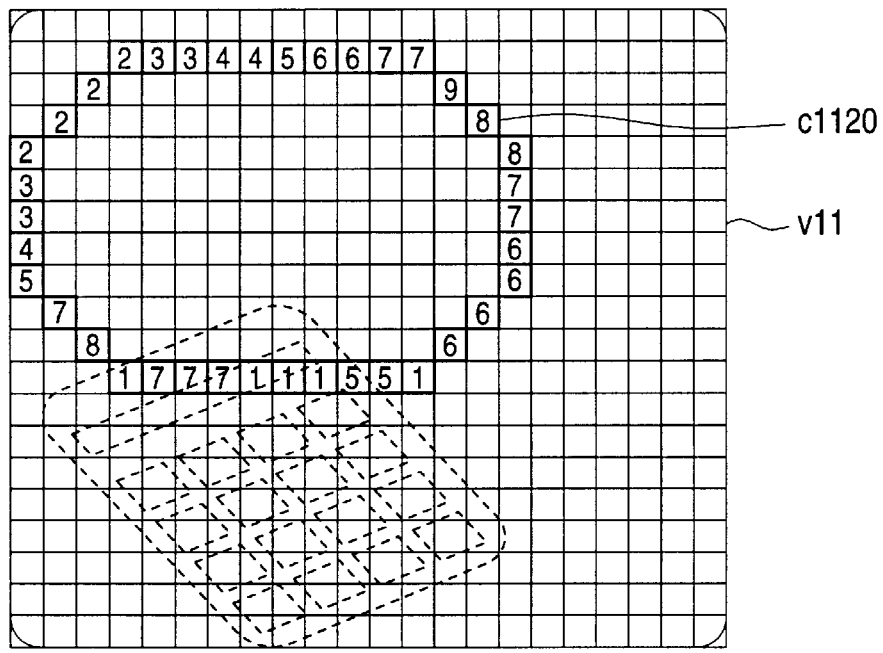
FIGS. 38A and 38B are diagrams illustrating the order of computing the correlated values according to the seventh embodiment of the invention.
Figure 38B:
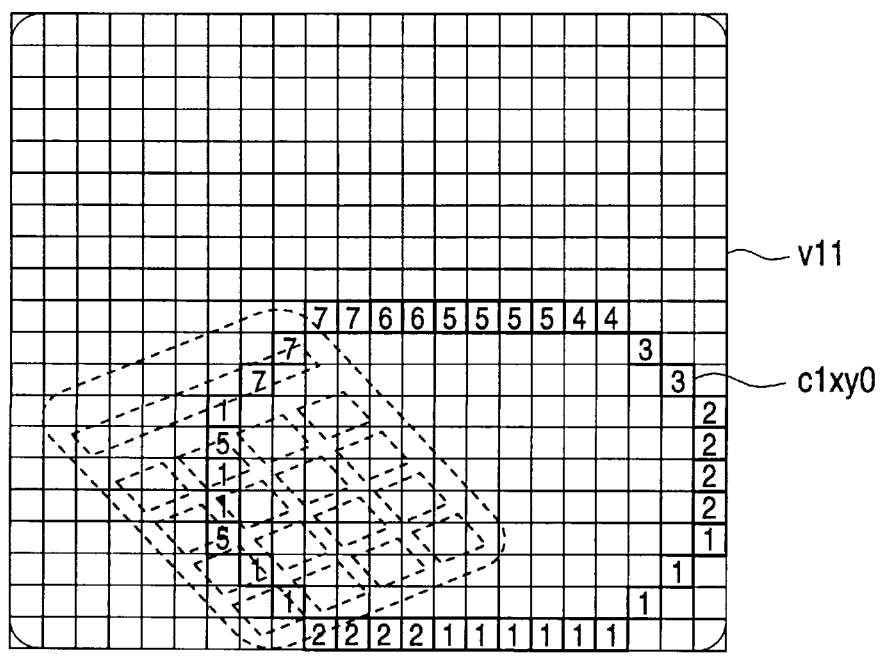

At Step S417, the CPU 1 creates an ellipse c1210 by shifting the ellipse c1110 by one pixel in the x direction as shown in FIG. 37A and as in the case of the ellipse c1110, repeats the steps from Step S411 up to S416. Further, the CPU 1 repeats the steps from Step S411 up to S416 while shifting the ellipse pixel by pixel in the x direction, shifts the ellipse in the y direction by one pixel as shown in FIG. 38A on terminating the shifting operation of one line in the x direction as shown in FIG. 37B and returns to Step S409 after reaching the final pixel as shown in FIG. 38B. The CPU 1 terminates the processing when the termination command is given as shown at Step S409 (termination of computing the entire pixel).

Although a description has been given of the elliptic window frame according to this embodiment of the invention, the invention may be applicable to any concentric form such as a polygon. Moreover, the advantage is that the use of the concentric elliptic area makes it possible to form a window by freely selecting the ratio of the long diameter to the short one, which means that the position of a camera for imaging an object for detection can freely be set. When the long-to-short diameter ratio is used to convert the elliptic shape to the circular one so as to create data, further, data is standardized and the number of data to be handled is reducible simultaneously with facility in comparing the variable quantity of the central angular position with that of the pixel area because these quantities always correspond to each other at a one-to-one ratio, whereby the recognition accuracy can be improved.

The image processing apparatus for recognizing an arrangement of an object for detection by comparing first image data obtained through imaging the object for detection with pre-cataloged second data concerning the object therefor according to the present invention comprises the workpiece image data cataloging means for setting a predetermined concentrically-shaped area of the first and second image data as a workpiece image; the luminance graph generating means for dividing into a concentric arrangement a plurality of pixels constituting the image data in the concentrically-shaped area set by the image data cataloging means and extracting the plurality of pixels so as to generate the luminance of the plurality of pixels thus divided into the concentric arrangement as a function of a concentrically-shaped central angular position; the characteristic value computing means for computing a character representing the characteristics of the luminance of the plurality of concentrically-arranged pixels generated by the luminance graph generating means together with the central angular position; and the central angular position pattern computing means for computing the central angular position giving the characteristics of luminance computed by the characteristic value computing means as a function of the distance from the center of the plurality of the divided concentrically-arranged positions, wherein the arrangement of the object for detection is recognized by comparing the first and second image data with the relation between the central angular position giving the characteristics of luminance concerning the concentrically-arranged positions computed by the central angular position pattern computing means, and the distance from the center of the plurality of the divided concentrically-arranged positions. Therefore, the character representing the characteristics of the luminance of the plurality of concentrically-arranged pixels can simply be expressed by the concentrically-shaped central angular position and the distance from the center with the effect of allowing the arrangement of the object for detection to be recognized with greater efficiency.

Further, the concentrically-shaped area is the concentrically-shaped area between the first and second distances from the center. Therefore, any portion unnecessary for the recognition of the arrangement of the object for detection is excluded with the effect of improving accuracy in the recognition of the arrangement of the object therefor.

Further, since the concentrically-shaped area is a concentric circular area, further, the concentric shape can simply be divided, which has the effect of dividing an area to be recognized with simplicity.

Further, since the concentrically-shaped area is a concentric elliptic area, further, a ratio of vertical length to horizontal length can freely be set when the concentric shape is divided, which has the effect of allowing the shape of an area being recognized to be freely selected.

Further, the luminance graph generating means converts the plurality of pixels thus divided into a concentric elliptic arrangement to an concentric circular arrangement using a ratio of the long diameter of an ellipse to the short diameter thereof and then generates the luminance of the plurality of pixels in the concentric circular arrangement as a function of the central angular position of a concentric circle. Therefore, the variable quantity of the central angular position and that of the pixel area always correspond to each other at a one-to-one ratio with the effect of facilitating the comparison between the arrangement of one object for detection and that of another.

Further, since the arrangement of the object for detection corresponds to an inclination of the object from the reference line, the object is recognized by the difference between the central angular positions of both patterns when the central angular position patterns of the first and second image data are highly correlated, which has the effect of allowing the inclination of the object from the reference line to be recognized with efficiency.

Further, since the arrangement of the object for detection corresponds to a position of the object from the reference point, the object is recognized from the reference point when the central angular position patterns of the first and second image data are highly correlated, which has the effect of allowing the position of the object from the reference point to be recognized with efficiency.

Further, the characteristic value computing means makes it a character representing the characteristics of the luminance of the plurality of concentrically-arranged pixels that the initial term of Fourier series is a maximum value, the initial term thereof being obtained by subjecting to Fourier expansion the luminance of the plurality of concentrically-arranged pixels as a function of the central angular position generated by the luminance graph generating means in terms of the central angular position. Therefore, the fundamental wave of luminance as a function of the central angular position is made the character representing the characteristics of the luminance with the effect of allowing the characteristics of the arrangement of the object for detection to be precisely defined and recognized with efficiency.

Further, the characteristic value computing means makes it a character representing the characteristics of the luminance of the plurality of concentrically-arranged pixels that the center of gravity is concerned with the central angular position of the luminance as a function of the central angular position generated by the luminance graph generating means. Therefore, the density of luminance distribution with respect to the central angular position is made a character representing the characteristics of the luminance with the effect of allowing the characteristics of the arrangement of the object for detection to be simply defined and recognized with efficiency.

Further, the characteristic value computing means makes it a character representing the characteristics of the luminance of the plurality of concentrically-arranged pixels that the luminance with respect to the central angular position of the luminance as a function of the central angular position generated by the luminance graph generating means is maximized. Therefore, the size of the luminance in luminance distribution with respect to the central angular position is made a character representing the characteristics of the luminance with the effect of allowing the characteristics of the arrangement of the object for detection to be simply defined and recognized with efficiency.

Further, the luminance graph generating means extracts the plurality of concentrically-arranged pixels by thinning out the pixels at a predetermined thinning ratio and generates the luminance of the plurality of concentrically-arranged pixels thus extracted as a function of the concentrically-shaped central angular position. Therefore, the number of data to be generated is minimized with the effect of allowing the arrangement of the object for detection to be recognized with extreme efficiency.

Further, the characteristic value computing means makes a non-zero value a character representing the characteristics of the luminance, the non-zero value being selected from among values of the initial term of Fourier series. Therefore, data unnecessary for the recognition of the arrangement of the object for detection is excluded with the effect of improving accuracy in recognizing the arrangement of the object for detection.

When values of the initial term of Fourier series are totally zero, further, the characteristic value computing means decides that the object for detection has such a shape that its inclination from the reference line is unspecifiable. Therefore, the aptitude of the object for detection is decided before the first and second data are fully compared with the effect of allowing the inclination of the object from the reference line to be recognized with extreme efficiency.

Further, the image processing method for recognizing an arrangement of an object for detection by comparing the first image data obtained through imaging the object for detection with the pre-cataloged second data concerning the object therefor comprises the steps of setting the predetermined concentrically-shaped area of the first and second image data as a workpiece image; dividing into a concentric arrangement the plurality of pixels constituting the image data in the concentrically-shaped area and extracting the plurality of pixels so as to generate the luminance of the plurality of pixels thus divided into the concentric arrangement as a function of the concentrically-shaped central angular position; computing a character representing the characteristics of the luminance of the plurality of concentrically-arranged pixels together with the central angular position; computing the central angular position giving the characteristics of luminance as a function of the distance from the center of the plurality of the divided concentrically-arranged positions; and comparing the first and second image data with the relation between the central angular position giving the characteristics of luminance concerning the concentrically-arranged positions and the distance from the center of the plurality of the divided concentrically-arranged positions so as to recognize the arrangement of the object for detection. Therefore, the character representing the characteristics of the luminance of the plurality of concentrically-arranged pixels can simply be expressed by the concentrically-shaped central angular position and the distance from the center with the effect of allowing the arrangement of the object for detection to be recognized with greater efficiency.

Further, since the concentrically-shaped area is a concentric circular area, further, the concentric shape can simply be divided, which has the effect of dividing an area to be recognized with simplicity.

Further, since the concentrically-shaped area is a concentric elliptic area, further, a ratio of vertical length to horizontal length can freely be set when the concentric shape is divided, which has the effect of allowing the shape of an area being recognized to be freely selected.

Further, since the arrangement of the object for detection corresponds to an inclination of the object from the reference line, the object is recognized by the difference between the central angular positions of both patterns when the central angular position patterns of the first and second image data are highly correlated, which has the effect of allowing the inclination of the object from the reference line to be recognized with efficiency.

Further, since the arrangement of the object for detection corresponds to a position of the object from the reference point, the object is recognized from the reference point when the central angular position patterns of the first and second image data are highly correlated, which has the effect of allowing the position of the object from the reference point to be recognized with efficiency.

Further, a character representing the characteristics of the luminance of the plurality of concentrically-arranged pixels signifies that the initial term of Fourier series is a maximum value, the initial term thereof being obtained by subjecting to Fourier expansion the luminance of the plurality of concentrically-arranged pixels as a function of the central angular position generated by the luminance graph generating means in terms of the central angular position. Therefore, the fundamental wave of luminance as a function of the central angular position is made the character representing the characteristics of the luminance with the effect of allowing the characteristics of the arrangement of the object for detection to be precisely defined and recognized with efficiency.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus for recognizing an arrangement of an object to be detected by comparing first image data obtained through imaging said object to be detected with pre-cataloged second image data concerning said object, said apparatus comprising:

workpiece image data cataloging means for setting a predetermined concentrically-shaped area of said first and second image data as a workpiece image, said concentrically-shaped area being of sufficient size to include the exterior edge the object;

luminance graph generating means for dividing into a concentric arrangement a plurality of pixels constituting the image data in the concentrically-shaped area set by said image data cataloging means and extracting the plurality of pixels so as to generate the luminance of the plurality of pixels thus divided into the concentric arrangement as a function of a central angular position with respect to said concentrically-shaped area;

characteristic value computing means for computing a character representing the characteristics of the luminance of the plurality of concentrically-arranged pixels generated by said luminance graph generating means together with the central angular position; and central angular position pattern computing means for computing the central angular position living said characteristics of luminance computed by said characteristic value computing means as a function of the distance from the center of the plurality of the divided concentrically-arranged positions;

wherein the arrangement of said object is recognized by comparing said first and second image data with the relation between the central angular position giving said characteristics of luminance concerning the concentrically-arranged positions computed by said central angular position pattern computing means, and the distance from the center of the plurality of the divided concentrically-arranged positions; and wherein said characteristic value computing means makes it a character representing the characteristics of the luminance of the plurality of concentrically-arranged pixels that the initial term of Fourier series is a maximum value, the initial term thereof being obtained by subjecting to Fourier expansion the luminance of the plurality of concentrically-arranged pixels as a function of the central angular position generated by said luminance graph generating means in terms of the central angular position.

2. An image processing apparatus for recognizing an arrangement of an object to be detected by comparing first image data obtained through imaging said object to be detected with pre-catalyzed second image data concerning said object, said apparatus comprising:

workpiece image data cataloging means for setting a predetermined concentrically-shaped area of said first and second image data as a workpiece image, said concentrically-shaped area being of sufficient size to include the exterior edge the object;

luminance graph generating means for dividing into a concentric arrangement a plurality of pixels constituting the image data in the concentrically-shaped area set by said image data cataloging means and extracting the plurality of pixels so as to generate the luminance of the plurality of pixels thus divided into the concentric arrangement as a function of a central angular position with respect to said concentrically-shaped area;

characteristic value computing means for computing a character representing the characteristics of the luminance of the plurality of concentrically-arranged pixels generated by said luminance graph generating means together with the central angular position; and central annular position pattern computing means for computing the central angular position giving said characteristics of luminance computed by said characteristic value computing means as a function of the distance from the center of the plurality of the divided concentrically-arranged positions;

wherein the arrangement of said object is recognized by comparing said first and second image data with the relation between the central angular position giving said characteristics of luminance concerning the concentrically-arranged positions computed by said central angular position pattern computing means, and the distance from the center of the plurality of the divided concentrically-arranged positions; and wherein said characteristic value computing means makes it a character representing the characteristics of the luminance of the plurality of concentrically-arranged pixels that the center of gravity is concerned with the central angular position of the luminance as a function of the central angular position generated by said luminance graph generating means.

3. An image processing apparatus for recognizing an arrangement of an object to be detected by comparing first image data obtained through imaging said object to be detected with pre-cataloged second image data concerning said object, said apparatus comprising:

workpiece image data cataloging means for setting a predetermined concentrically-shaped area of said first and second image data as a workpiece image, said concentrically-shaped area being of sufficient size to include the exterior edge the object;

luminance graph generating means for dividing into a concentric arrangement a plurality of pixels constituting the image data in the concentrically-shaped area set by said image data cataloging means and extracting the plurality of pixels so as to generate the luminance of the plurality of pixels thus divided into the concentric arrangement as a function of a central angular position with respect to said concentrically-shaped area;

characteristic value computing means for computing a character representing the characteristics of the luminance of the plurality of concentrically-arranged pixels generated by said luminance graph generating means together with the central angular position; and central angular position pattern computing means for computing the central angular position giving said characteristics of luminance computed by said characteristic value computing means as a function of the distance from the center of the plurality of the divided concentrically-arranged positions;

wherein the arrangement of said object is recognized by comparing said first and second image data with the relation between the central angular position giving said characteristics of luminance concerning the concentrically-arranged positions computed by said central angular position pattern computing means, and the distance from the center of the plurality of the divided concentrically-arranged positions; and wherein said characteristic value computing means makes it a character representing the characteristics of the luminance of the plurality of concentrically-arranged pixels that the luminance with respect to the central angular position of the luminance as a function of the central angular position generated by said luminance graph generating means is maximized.

4. An image processing apparatus as claimed in claim 1, wherein said luminance graph generating means extracts the plurality of concentrically-arranged pixels by thinning out the pixels at a predetermined thinning ratio and generates the luminance of the plurality of concentrically-arranged pixels thus extracted as a function of the concentrically-shaped central angular position.

5. An image processing apparatus as claimed in claim 1, wherein said characteristic value computing means makes a non-zero value a character representing the characteristics of the luminance, the non-zero value being selected from among values of the initial term of said Fourier series.

6. An image processing apparatus as claimed in claim 1, wherein when values of the initial term of said Fourier series are totally zero, said characteristic value computing means decides that said object has such a shape that its inclination from the reference line is unspecifiable.

7. An image processing method for recognizing an arrangement of an object to be detected by comparing first image data obtained through imaging said object with pre-cataloged second data concerning said object therefor, said method comprising the steps of:

setting a predetermined concentrically-shaped area of said first and second image data as a workpiece image, said concentrically-shaped area being of sufficient size to include the exterior edge the object;

dividing into a concentric arrangement a plurality of pixels constituting the image data in the concentrically-shaped area and extracting the plurality of pixels so as to generate the luminance of the plurality of pixels thus divided into the concentric arrangement as a function of a central angular position with respect to said concentrically-shaped area;

computing a character representing the characteristics of the luminance of the plurality of concentrically-arranged pixels to ether with the central angular position;

computing the central angular position giving said characteristics of luminance as a function of the distance from the center of the plurality of the divided concentrically-arranged positions; and comparing said first and second image data with the relation between the central angular position giving said characteristics of luminance concerning the concentrically-arranged positions and the distance from the center of the plurality of the divided concentrically-arranged positions so as to recognize the arrangement of said object;

wherein a character representing the characteristics of the luminance of the plurality of concentrically-arranged pixels features that the initial term of Fourier series is a maximum value, the initial term thereof being obtained by subjecting to Fourier expansion the luminance of the plurality of concentrically-arranged pixels as a function of the central angular position generated in terms of the central angular position.

* * * * *

UNITED STATES PATENT AND TRADEMARK OFFICE
CERTIFICATE OF CORRECTION

PATENT NO. : 5,987,162
DATED : November 16, 1999
INVENTOR(S) : Nakata, Masafumi

It is certified that error appears in the above-identified patent and that said Letters Patent is hereby corrected as shown below:

Column 11,
The Numerical Formula 5 should read as follows:

$$s = \frac{\sqrt{\left\{\sum_{i=0}^{n-1}\sin(pi - p11i)\right\}^2 + \left\{\sum_{i=0}^{n-1}\cos(pi - p11i)\right\}^2}}{n}$$

Column 17,
The Numerical Formula 13 should read as follows:

$$s = \frac{\sqrt{\left\{\sum_{i=0}^{n-1}\sin(p100i - p111i)\right\}^2 + \left\{\sum_{i=0}^{n-1}\cos(p100i - p111i)\right\}^2}}{n}$$

Signed and Sealed this

Eleventh Day of September, 2001

Attest:

NICHOLAS P. GODICI
Attesting Officer     Acting Director of the United States Patent and Trademark Office